United States Patent
Zhao et al.

(10) Patent No.: US 12,250,728 B2
(45) Date of Patent: Mar. 11, 2025

(54) METHOD APPLIED AT NODE FOR WIRELESS COMMUNICATION AND APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/797,597

(22) Filed: Aug. 8, 2024

(65) Prior Publication Data

US 2024/0397560 A1 Nov. 28, 2024

Related U.S. Application Data

(63) Continuation of application No. PCT/CN2023/088495, filed on Apr. 14, 2023.

(51) Int. Cl.
*H04W 74/0833* (2024.01)
*H04W 74/00* (2009.01)

(52) U.S. Cl.
CPC ..... *H04W 74/0833* (2013.01); *H04W 74/006* (2013.01)

(58) Field of Classification Search
CPC .............. H04W 74/0833; H04W 74/006
See application file for complete search history.

(56) References Cited

U.S. PATENT DOCUMENTS

2015/0016312 A1* 1/2015 Li .............................. H04L 5/14
370/280
2020/0236524 A1* 7/2020 Ye ......................... H04L 5/0012
(Continued)

FOREIGN PATENT DOCUMENTS

CN 107889244 4/2018
WO WO 2017023066 2/2017
(Continued)

OTHER PUBLICATIONS

3GPP TS 38.215 V17.3.0, "3rd Generation Partnership Project; Technical Specification Group Radio Access Network; NR; Physical layer measurements (Release 17) The present," Mar. 2023, 26 pages.

(Continued)

*Primary Examiner* — Siren Wei
(74) *Attorney, Agent, or Firm* — Fish & Richardson P.C.

(57) ABSTRACT

A method applied at a node for wireless communication and an apparatus are provided. One method includes: transmitting a first plurality of random access preambles by using a first spatial filter, wherein a first plurality of physical random access channel occasions are used for transmission of the first plurality of random access preambles; monitoring a first control signaling during a first time window in response to the first plurality of random access preambles; transmitting a second plurality of random access preambles by using a second spatial filter, wherein a second plurality of physical random access channel occasions are used for transmission of the second plurality of random access preambles; and (Continued)

monitoring a second control signaling during a second time window in response to the second plurality of random access preambles.

20 Claims, 6 Drawing Sheets

(56) References Cited

U.S. PATENT DOCUMENTS

| | | | |
|---|---|---|---|
| 2020/0281018 A1 | 9/2020 | Li et al. | |
| 2020/0351801 A1* | 11/2020 | Jeon | H04W 52/48 |
| 2020/0374928 A1 | 11/2020 | Xiong et al. | |
| 2021/0051707 A1* | 2/2021 | Rastegardoost | H04W 72/23 |
| 2021/0282189 A1 | 9/2021 | Irukulapati et al. | |
| 2021/0329692 A1 | 10/2021 | Boroujeni et al. | |
| 2022/0046714 A1* | 2/2022 | Zhou | H04L 25/0224 |
| 2022/0159728 A1 | 5/2022 | Turtinen et al. | |
| 2022/0191945 A1* | 6/2022 | Yamamoto | H04B 17/309 |
| 2022/0353919 A1 | 11/2022 | Liu | |

FOREIGN PATENT DOCUMENTS

| | | |
|---|---|---|
| WO | WO 2022061847 | 3/2022 |
| WO | WO 2022067519 | 4/2022 |
| WO | WO 2022071755 | 4/2022 |
| WO | WO 2022133357 | 6/2022 |

OTHER PUBLICATIONS

China Telecom, "FL Summary#3 on PRACH coverage enhancements," 3GPP TSG RAN WG1 #112, R1-2301850, Athens, Greece, Feb. 27-Mar. 3, 2023, 47 pages.

Ericsson, "On multiple preamble transmissions for contention free random access," 3GPP TSG RAN WG1 Meeting #92, R1-1802950, Athens, Greece, Feb. 26-Mar. 2, 2018, 5 pages.

Huawei et al., "RACH procedures and resource configuration," 3GPP TSG RAN WG1 Meeting #90, R1-1712145, Prague, Czech Republic, Aug. 21-25, 2017, 4 pages.

International Search Report and Written Opinion in International Appln. No. PCT/CN2023/088495, mailed on Dec. 4, 2023, 16 pages (with English translation).

Lenovo, "PRACH coverage enhancements," 3GPP TSG RAN WG1 #112bis-e, R1-2303090, e-meeting, Apr. 17-Apr. 26, 2023, 8 pages.

Office Action in Chinese Appln. No. 202380010768.4, mailed on Apr. 3, 2024, 27 pages (with English translation).

Office Action in Chinese Appln. No. 202380010768.4, mailed on Jun. 27, 2024, 7 pages (with English translation).

\* cited by examiner

METHOD APPLIED AT NODE FOR WIRELESS COMMUNICATION AND APPARATUS

CROSS-REFERENCE TO RELATED APPLICATIONS

This application is a continuation of International Application No. PCT/CN2023/088495, filed on Apr. 14, 2023, the disclosure of which is hereby incorporated by reference in its entirety.

TECHNICAL FIELD

The present disclosure relates to the field of communication technology, and more specifically to a method and apparatus applied at a node for wireless communication.

BACKGROUND

In order to enhance coverage performance of a physical random access channel (PRACH), some communication systems (e.g., new radio (NR) systems) plan to introduce the scheme of multiple PRACH transmissions. At present, for multiple PRACH transmissions in a random access attempt, only one time window may be supported for monitoring control signaling. If a uniformly configured time window length is used in the scheme of the multiple PRACH transmissions, the uniformly configured time window length may not be able to satisfy configuration requirements for the multiple PRACH transmissions. Or, it may result in lengthening time spans of the multiple PRACH transmissions in order to satisfy the requirement for the number of valid moments of the physical random access channel, which may result in a further lengthening of the uniformly configured time window. Or, it may affect the performance of the multiple PRACH transmissions, making the PRACH transmission a bottleneck in the coverage of the communication system.

SUMMARY

Embodiments of the present disclosure provide a method applied at a node for wireless communication and an apparatus. The following describes various aspects involved in the present disclosure.

According to a first aspect, a first node for wireless communication is provided, including: a first transmitter, configured to transmit a plurality of random access preambles, where a plurality of physical random access channel occasions are used for transmission of the plurality of random access preambles, and the plurality of physical random access channel occasions respectively correspond to a plurality of physical random access channel transmissions; and a first receiver, configured to monitor a first control signaling during a first time window in response to the plurality of physical random access channel transmissions; where the first time window has a length that is related to a number of the plurality of physical random access channel transmissions.

In an implementation, the first control signaling is scrambled by a first radio network temporary identifier, RNTI, and the first RNTI is associated with the plurality of physical random access channel occasions.

In an implementation, the length of the first time window is linearly related to the number of the plurality of physical random access channel transmissions.

In an implementation, the length of the first time window is one of a plurality of candidate time lengths, and the number of the plurality of physical random access channel transmissions is one of a plurality of candidate numbers, where the plurality of candidate time lengths are in one-to-one correspondence with the plurality of candidate numbers, or one of the plurality of candidate time lengths corresponds to at least one of the plurality of candidate numbers; and where the number of the plurality of physical random access channel transmissions is used to determine the length of the first time window from the plurality of candidate time lengths.

In an implementation, the length of the first time window belongs to one of a plurality of candidate time length groups, and any one of the plurality of candidate time length groups includes at least one time length; where the number of the plurality of physical random access channel transmissions is one of a plurality of candidate numbers, where the plurality of candidate time length groups are in one-to-one correspondence with the plurality of candidate numbers, or one of the plurality of candidate time length groups corresponds to at least one of the plurality of candidate numbers; and where the number of the plurality of physical random access channel transmissions is used to determine, from the plurality of candidate time length groups, a candidate time length group to which the length of the first time window belongs.

In an implementation, the first receiver receives first configuration information; where both the first configuration information and the number of the plurality of physical random access channel transmissions are used to determine the length of the first time window.

In an implementation, the first configuration information includes at least two candidate time lengths, and the number of the plurality of physical random access channel transmissions is used to determine the length of the first time window from the at least two candidate time lengths.

In one implementation, the number of the plurality of physical random access channel transmissions corresponds to one of a plurality of candidate time length groups, and any one of the plurality of candidate time length groups includes at least one time length; and where the first configuration information is used to determine the length of the first time window from a candidate time length group corresponding to the number of the plurality of physical random access channel transmissions in the plurality of candidate time length groups.

In an implementation, the first receiver receives second configuration information, where the second configuration information includes a candidate time length; where the length of the first time window is determined based on the candidate time length and a first coefficient, and the first coefficient is related to the number of the plurality of physical random access channel transmissions.

In an implementation, the first coefficient is equal to the number of the plurality of physical random access channel transmissions.

In an implementation, the first time window starts after a last multicarrier symbol of a last physical random access channel occasion among the plurality of physical random access channel occasions.

In an implementation, the first time window starts after a last multicarrier symbol of a first physical random access channel occasion in the plurality of physical random access channel occasions.

In an implementation, the first receiver receives first information, wherein the first information indicates a number of at least one physical random access channel occasion within a time instant, and in response to the number of the at least one physical random access channel occasion within the time instant being greater than 1, a plurality of physical random access channel occasions within the time instant are frequency multiplexed; where the length of the first time window is related to the number of the at least one physical random access channel occasion within the time instant.

In an implementation, any two physical random access channel occasions in the plurality of physical random access channel occasions are respectively in two different time instants.

In an implementation, the plurality of physical random access channel occasions belong to one of a plurality of random access occasion groups, and any one of the plurality of random access occasion groups includes a plurality of physical random access channel occasions; and where the plurality of physical random access channel occasions included in each of at least two random access occasion groups in the plurality of random access occasion groups include at least one different physical random access channel occasion.

In an implementation, the plurality of physical random access channel occasions belong to one of a plurality of random access occasion groups, any one of the plurality of random access occasion groups includes a plurality of physical random access channel occasions, and the plurality of random access occasion groups respectively correspond to a plurality of preambles; and where preambles corresponding to at least two random access occasion groups in the plurality of random access occasion groups are different.

In an implementation, the first receiver receives a first synchronization signal block, and a reception quality of the first synchronization signal block is used to determine the number of the plurality of physical random access channel transmissions.

In an implementation, the number of the plurality of physical random access channel transmissions is one of 2, 4, and 8.

In an implementation, a plurality of beams are respectively used to transmit the plurality of random access preambles, and the plurality of beams are same.

In an implementation, the first receiver receives a first transport block during the first time window, where the first transport block is in a corresponding physical downlink shared channel, PDSCH, and the first control signaling is used to schedule the PDSCH.

According to a second aspect, a second node for wireless communication is provided, including: a first receiver, configured to receive at least one of a plurality of random access preambles, where a plurality of physical random access channel occasions are used for transmission of the plurality of random access preambles, and the plurality of physical random access channel occasions respectively correspond to a plurality of physical random access channel transmissions; and a first transmitter, configured to transmit a first control signaling during a first time window in response to the plurality of physical random access channel transmissions; where the first time window has a length that is related to a number of the plurality of physical random access channel transmissions.

In an implementation, the first control signaling is scrambled by a first radio network temporary identifier, RNTI, and the first RNTI is associated with the plurality of physical random access channel occasions.

In an implementation, the length of the first time window is linearly related to the number of the plurality of physical random access channel transmissions.

In an implementation, the length of the first time window is one of a plurality of candidate time lengths, and the number of the plurality of physical random access channel transmissions is one of a plurality of candidate numbers, where the plurality of candidate time lengths are in one-to-one correspondence with the plurality of candidate numbers, or one of the plurality of candidate time lengths corresponds to at least one of the plurality of candidate numbers; and where the number of the plurality of physical random access channel transmissions is used to determine the length of the first time window from the plurality of candidate time lengths.

In an implementation, the length of the first time window belongs to one of a plurality of candidate time length groups, and any one of the plurality of candidate time length groups includes at least one time length; where the number of the plurality of physical random access channel transmissions is one of a plurality of candidate numbers, where the plurality of candidate time length groups are in one-to-one correspondence with the plurality of candidate numbers, or one of the plurality of candidate time length groups corresponds to at least one of the plurality of candidate numbers; and where the number of the plurality of physical random access channel transmissions is used to determine, from the plurality of candidate time length groups, a candidate time length group to which the length of the first time window belongs.

In an implementation, the first transmitter transmits first configuration information; where both the first configuration information and the number of the plurality of physical random access channel transmissions are used to determine the length of the first time window.

In an implementation, the first configuration information includes at least two candidate time lengths, and the number of the plurality of physical random access channel transmissions is used to determine the length of the first time window from the at least two candidate time lengths.

In one implementation, the number of the plurality of physical random access channel transmissions corresponds to one of a plurality of candidate time length groups, and any one of the plurality of candidate time length groups includes at least one time length; and where the first configuration information is used to determine the length of the first time window from a candidate time length group corresponding to the number of the plurality of physical random access channel transmissions in the plurality of candidate time length groups.

In an implementation, the first transmitter transmits second configuration information, where the second configuration information includes a candidate time length; where the length of the first time window is determined based on the candidate time length and a first coefficient, and the first coefficient is related to the number of the plurality of physical random access channel transmissions.

In an implementation, the first coefficient is equal to the number of the plurality of physical random access channel transmissions.

In an implementation, the first time window starts after a last multicarrier symbol of a last physical random access channel occasion among the plurality of physical random access channel occasions.

In an implementation, the first time window starts after a last multicarrier symbol of a first physical random access channel occasion among the plurality of physical random access channel occasions.

In an implementation, the first transmitter transmits first information, where the first information indicates a number of at least one physical random access channel occasion within a time instant, and in response to the number of the at least one physical random access channel occasion within the time instant being greater than 1, a plurality of physical random access channel occasions within the time instant are frequency multiplexed; where the length of the first time window is related to the number of the at least one physical random access channel occasion within the time instant.

In an implementation, any two physical random access channel occasions in the plurality of physical random access channel occasions are respectively in two different time instants.

In an implementation, the plurality of physical random access channel occasions belong to one of a plurality of random access occasion groups, and any one of the plurality of random access occasion groups includes a plurality of physical random access channel occasions; and where the plurality of physical random access channel occasions included in each of at least two random access occasion groups in the plurality of random access occasion groups include at least one different physical random access channel occasion.

In an implementation, the plurality of physical random access channel occasions belong to one of a plurality of random access occasion groups, any one of the plurality of random access occasion groups includes a plurality of physical random access channel occasions, and the plurality of random access occasion groups respectively correspond to a plurality of preambles; and where preambles corresponding to at least two random access occasion groups in the plurality of random access occasion groups are different.

In an implementation, the first transmitter transmits a first synchronization signal block, and a reception quality of the first synchronization signal block is used to determine the number of the plurality of physical random access channel transmissions.

In an implementation, the number of the plurality of physical random access channel transmissions is one of 2, 4, and 8.

In an implementation, a plurality of beams are respectively used to transmit the plurality of random access preambles, and the plurality of beams are same.

In an implementation, the first transmitter transmits a first transport block during the first time window, wherein the first transport block is in a corresponding physical downlink shared channel, PDSCH, and the first control signaling is used to schedule the PDSCH.

According to a third aspect, a method applied at a first node for wireless communication is provided, including: transmitting a plurality of random access preambles, where a plurality of physical random access channel occasions are used for transmission of the plurality of random access preambles, and the plurality of physical random access channel occasions respectively correspond to a plurality of physical random access channel transmissions; and monitoring a first control signaling during a first time window in response to the plurality of physical random access channel transmissions; where the first time window has a length that is related to a number of the plurality of physical random access channel transmissions.

In an implementation, the first control signaling is scrambled by a first radio network temporary identifier, RNTI, and the first RNTI is associated with the plurality of physical random access channel occasions.

In an implementation, the length of the first time window is linearly related to the number of the plurality of physical random access channels.

In an implementation, the length of the first time window is one of a plurality of candidate time lengths, and the number of the plurality of physical random access channel transmissions is one of a plurality of candidate numbers, where the plurality of candidate time lengths are in one-to-one correspondence with the plurality of candidate numbers, or one of the plurality of candidate time lengths corresponds to at least one of the plurality of candidate numbers; and where the number of the plurality of physical random access channel transmissions is used to determine the length of the first time window from the plurality of candidate time lengths.

In an implementation, the length of the first time window belongs to one of a plurality of candidate time length groups, and any one of the plurality of candidate time length groups includes at least one time length; where the number of the plurality of physical random access channel transmissions is one of a plurality of candidate numbers, where the plurality of candidate time length groups are in one-to-one correspondence with the plurality of candidate numbers, or one of the plurality of candidate time length groups corresponds to at least one of the plurality of candidate numbers; and where the number of the plurality of physical random access channel transmissions is used to determine, from the plurality of candidate time length groups, a candidate time length group to which the length of the first time window belongs.

In an implementation, the method includes: receiving first configuration information; where both the first configuration information and the number of the plurality of physical random access channel transmissions are used to determine the length of the first time window.

In an implementation, the first configuration information includes at least two candidate time lengths, and the number of the plurality of physical random access channel transmissions is used to determine the length of the first time window from the at least two candidate time lengths.

In one implementation, the number of the plurality of physical random access channel transmissions corresponds to one of a plurality of candidate time length groups, and any one of the plurality of candidate time length groups includes at least one time length; and where the first configuration information is used to determine the length of the first time window from a candidate time length group corresponding to the number of the plurality of physical random access channel transmissions in the plurality of candidate time length groups.

In an implementation, the method includes: receiving second configuration information, where the second configuration information includes a candidate time length; where the length of the first time window is determined based on the candidate time length and a first coefficient, and the first coefficient is related to the number of the plurality of physical random access channel transmissions.

In an implementation, the first coefficient is equal to the number of the plurality of physical random access channel transmissions.

In an implementation, the first time window starts after a last multicarrier symbol of a last physical random access channel occasion among the plurality of physical random access channel occasions.

In an implementation, the first time window starts after a last multicarrier symbol of a first physical random access channel occasion among the plurality of physical random access channel occasions.

In an implementation, the method includes: receiving first information, where the first information indicates a number of at least one physical random access channel occasion within a time instant, and in response to the number of the at least one physical random access channel occasion within the time instant being greater than 1, a plurality of physical random access channel occasions within the time instant are frequency multiplexed; where the length of the first time window is related to the number of the at least one physical random access channel occasion within the time instant.

In an implementation, any two physical random access channel occasions in the plurality of physical random access channel occasions are respectively in two different time instant.

In an implementation, the plurality of physical random access channel occasions belong to one of a plurality of random access occasion groups, and any one of the plurality of random access occasion groups includes a plurality of physical random access channel occasions; and where the plurality of physical random access channel occasions included in each of at least two random access occasion groups in the plurality of random access occasion groups include at least one different physical random access channel occasion.

In an implementation, the plurality of physical random access channel occasions belong to one of a plurality of random access occasion groups, any one of the plurality of random access occasion groups includes a plurality of physical random access channel occasions, and the plurality of random access occasion groups respectively correspond to a plurality of preambles; and where preambles corresponding to at least two random access occasion groups in the plurality of random access occasion groups is different.

In an implementation, the method includes: receiving a first synchronization signal block, where a reception quality of the first synchronization signal block is used to determine the number of the plurality of physical random access channel transmissions.

In an implementation, the number of the plurality of physical random access channel transmissions is one of 2, 4, and 8.

In an implementation, a plurality of beams are respectively used to transmit the plurality of random access preambles, and the plurality of beams are same.

In an implementation, the method includes: receiving a first transport block during the first time window, wherein the first transport block is in a corresponding physical downlink shared channel, PDSCH, and the first control signaling is used to schedule the PDSCH.

According to a fourth aspect, a method applied at a second node for wireless communication is provided, including: receiving at least one of a plurality of random access preambles, where the plurality of physical random access channel occasions are used for transmission of the plurality of random access preambles, and the plurality of physical random access channel occasions respectively correspond to a plurality of physical random access channel transmissions; and transmitting a first control signaling during a first time window in response to the plurality of physical random access channel transmissions; where the first time window has a length that is related to a number of the plurality of physical random access channel transmissions.

In an implementation, the first control signaling is scrambled by a first radio network temporary identifier, RNTI, and the first RNTI is associated with the plurality of physical random access channel occasions.

In an implementation, the length of the first time window is linearly related to the number of the plurality of physical random access channel transmissions.

In an implementation, the length of the first time window is one of a plurality of candidate time lengths, and the number of the plurality of physical random access channel transmissions is one of a plurality of candidate numbers, where the plurality of candidate time lengths are in one-to-one correspondence with the plurality of candidate numbers, or one of the plurality of candidate time lengths corresponds to at least one of the plurality of candidate numbers; and where the number of the plurality of physical random access channel transmissions is used to determine the length of the first time window from the plurality of candidate time lengths.

In an implementation, the length of the first time window belongs to one of a plurality of candidate time length groups, and any one of the plurality of candidate time length groups includes at least one time length; where the number of the plurality of physical random access channel transmissions is one of a plurality of candidate numbers, where the plurality of candidate time length groups are in one-to-one correspondence with the plurality of candidate numbers, or one of the plurality of candidate time length groups corresponds to at least one of the plurality of candidate numbers; and where the number of the plurality of physical random access channel transmissions is used to determine, from the plurality of candidate time length groups, a candidate time length group to which the length of the first time window belongs.

In an implementation, the method includes: transmitting first configuration information; where both the first configuration information and the number of the plurality of physical random access channel transmissions are used to determine the length of the first time window.

In an implementation, the first configuration information includes at least two candidate time lengths, and the number of the plurality of physical random access channel transmissions is used to determine the length of the first time window from the at least two candidate time lengths.

In an implementation, the number of the plurality of physical random access channel transmissions corresponds to one of a plurality of candidate time length groups, and any one of the plurality of candidate time length groups includes at least one time length; and where the first configuration information is used to determine the length of the first time window from a candidate time length group corresponding to the number of the plurality of physical random access channel transmissions in the plurality of candidate time length groups.

In an implementation, the method includes: transmitting second configuration information, where the second configuration information includes a candidate time length; where the length of the first time window is determined based on the candidate time length and a first coefficient, and the first coefficient is related to the number of the plurality of physical random access channel transmissions.

In an implementation, the first coefficient is equal to the number of the plurality of physical random access channel transmissions.

In an implementation, the first time window starts after a last multicarrier symbol of a last physical random access channel occasion among the plurality of physical random access channel occasions.

In an implementation, the first time window starts after a last multicarrier symbol of a first physical random access channel occasion among the plurality of physical random access channel occasions.

In an implementation, the method includes: transmitting first information, where the first information indicates a number of at least one physical random access channel occasion within a time instant, and in response to the number of the at least one physical random access channel occasion within the time instant being greater than 1, a plurality of physical random access channel occasions within the time instant are frequency multiplexed; where the length of the first time window is related to the number of the at least one physical random access channel occasion within the time instant.

In an implementation, any two physical random access channel occasions in the plurality of physical random access channel occasions are respectively in two different time instants.

In an implementation, the plurality of physical random access channel occasions belong to one of a plurality of random access occasion groups, and any one of the plurality of random access occasion groups includes a plurality of physical random access channel occasions; and where the plurality of physical random access channel occasions included in each of at least two random access occasion groups in the plurality of random access occasion groups include at least one different physical random access channel occasion.

In an implementation, the plurality of physical random access channel occasions belong to one of a plurality of random access occasion groups, any one of the plurality of random access occasion groups includes a plurality of physical random access channel occasions, and the plurality of random access occasion groups respectively correspond to a plurality of preambles; and where preambles corresponding to at least two random access occasion groups in the plurality of random access occasion groups are different.

In an implementation, the method includes: transmitting a first synchronization signal block, where a reception quality of the first synchronization signal block is used to determine the number of the plurality of physical random access channel transmissions.

In an implementation, the number of the plurality of physical random access channel transmissions is one of 2, 4, and 8.

In an implementation, a plurality of beams are respectively used to transmit the plurality of random access preambles, and the plurality of beams are same.

In an implementation, the method includes: transmitting a first transport block during the first time window, where the first transport block is in a corresponding physical downlink shared channel, PDSCH, and the first control signaling is used to schedule the PDSCH.

According to a fifth aspect, a first node for wireless communication is provided, including a transceiver, a memory, and a processor, where the memory is configured to store a program, the processor is configured to invoke the program in the memory and control the transceiver to receive or transmit a signal, so as to enable the first node to perform the method according to any implementation of the third aspect.

According to a sixth aspect, a second node for wireless communication is provided, including a transceiver, a memory, and a processor, where the memory is configured to store a program, the processor is configured to invoke the program in the memory and control the transceiver to receive or transmit a signal, so as to enable the second node to perform the method according to any implementation of the fourth aspect.

According to a seventh aspect, embodiments of the present disclosure provide a communication system, where the communication system includes the first node and/or the second node as described above. In another possible design, the communication system may further include another device that interacts with the first node or the second node in the solution provided in the embodiments of the present disclosure.

According to an eighth aspect, embodiments of the present disclosure provide a computer-readable storage medium storing a program that enables a computer to perform some or all of the operations in the methods in the foregoing aspects.

According to a ninth aspect, embodiments of the present disclosure provide a computer program product, where the computer program product includes a non-transitory computer-readable storage medium storing a computer program, and the computer program is operable to cause a computer to perform some or all of the operations in the methods in the foregoing aspects. In some implementations, the computer program product may be a software installation package.

According to a tenth aspect, embodiments of the present disclosure provide a chip including a memory and a processor, where the processor invokes a computer program from the memory and runs the computer program, to perform some or all of the operations in the methods in the foregoing aspects.

In the embodiments of the present disclosure, the length of the first time window can be determined according to the number of the plurality of PRACH transmissions, to meet the configuration requirements of the time windows of the plurality of PRACH transmissions with different PRACH numbers.

The method applied at a node for wireless communication and the apparatus provided in the embodiments of the present disclosure are beneficial to improving performance gains of the plurality of PRACH transmissions.

The method applied at a node for wireless communication and the apparatus provided in the embodiments of the present disclosure are beneficial to increasing a coverage of the communications system.

The method applied at a node for wireless communication and the apparatus provided in the embodiments of the present disclosure are beneficial to reducing a random access delay.

The method applied at a node for wireless communication and the apparatus provided in the embodiments of the present disclosure are beneficial to improving the utilization efficiency of a random access resource.

DETAILED DESCRIPTION OF THE EMBODIMENTS

Communication System Architecture

Figure 1:
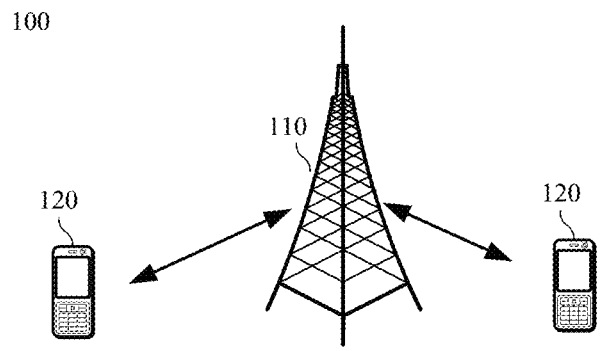
FIG. 1 is an example diagram of a system architecture of a wireless communication system applied in an embodiment of the present disclosure.

FIG. 1 is an example diagram of a system architecture of a wireless communication system 100 applied in an embodiment of the present disclosure. The wireless communication system 100 may include a network device 110 and a user equipment 120. The network device 110 may be a device in communication with the user equipment 120. The network device 110 may provide communication coverage for a particular geographic region and may communicate with the user equipment 120 located within the covered region.

FIG. 1 exemplarily shows a network device and two user equipments. Optionally, the wireless communication system 100 may include a plurality of network devices, and other numbers of user equipments may be included in the coverage of each network device, which is not limited in the embodiments of the present disclosure.

Optionally, the wireless communications system 100 may further include other network entities such as a network controller, a mobility management entity, etc., which is not limited in the embodiments of the present disclosure.

It should be understood that the technical solutions in the embodiments of the present disclosure may not only be used for random access, but also be used for beam failure recovery. Further, the technical solution in the embodiments of the present disclosure may be used for a type-1 random access procedure, and the technical solution in the embodiments of the present disclosure may also be used for a type-2 random access procedure. Further, the technical solution in the embodiments of the present disclosure may be used for a Uu interface, and the technical solution in the embodiments of the present disclosure may also be used for a PC5 interface. Further, the technical solutions in the embodiments of the present disclosure may be used for single-carrier communication, and the technical solutions in the embodiments of the present disclosure may also be used for multi-carrier communication. Further, the technical solutions in the embodiments of the present disclosure may be used for multi-antenna communication, and the technical solutions in the embodiments of the present disclosure may also be used for single-antenna communication. Further, the technical solutions in the embodiments of the present disclosure may be used in a scenario of a user equipment and a base station, and the technical solutions in the embodiments of the present disclosure are also applicable to scenarios such as vehicle-to-everything (V2X), communication between a user equipment and a relay, and communication between a relay and a base station, to obtain similar technical effects in the scenario of the user equipment and the base station. Further, the technical solutions in the embodiments of the present disclosure may be applied to various communication scenarios, for example, an enhanced mobile broadband (eMBB) scenario, an ultra reliable & low latency communication (URLLC) scenario, a massive machine type communication (mMTC) scenario, and the like. In addition, using a unified solution for different scenarios further helps to reduce hardware complexity and cost.

It should be understood that, in the case of no conflict, the embodiments of a first node in the present disclosure and the features in the embodiments may be applied to a second node, and vice versa. In the case of no conflict, the embodiments of the present disclosure and the features in the embodiments may be arbitrarily combined with each other.

It should be understood that the technical solutions in the embodiments of the present disclosure may be applied to various communication systems, such as a $5^{th}$ generation (5G) system or a new radio (NR) system, a long term evolution (LTE) system, an LTE frequency division duplex (FDD) system, an LTE time division duplex (TDD) system, and the like. The technical solution provided in the present disclosure may also be applied to a future communication system, such as a $6^{th}$ generation mobile communication system, a satellite communication system, or the like.

The user equipment in the embodiments of the present disclosure may also be referred to as a terminal device, an access terminal, a user unit, a user station, a mobile station, a mobile station (MS), a mobile terminal (MT), a remote station, a remote terminal, a mobile device, a user terminal, a terminal, a wireless communication device, a user agent, or a user apparatus. The user equipment in the embodiments of the present disclosure may be a device that provides voice and/or data connectivity to a user, and may be configured to connect a person, an object, and a machine, for example, a handheld device having a wireless connection function, an in-vehicle device, or the like. The user equipment in the embodiments of the present disclosure may be a mobile phone, a pad, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like. Optionally, the UE may be used as a base station. For example, the UE may act as a scheduling entity that provides sidelink signals between UEs in V2X or device-to-device (D2D), or the like. For example, cellular telephones and automobiles communicate with each other using the sidelink signals. The cellular telephones communicate with smart home devices without relaying communication signals through the base station.

The network device in the embodiments of the present disclosure may be a device configured to communicate with the user equipment, and the network device may also be referred to as an access network device or a radio access network device, for example, the network device may be the base station. The network device in the embodiments of the present disclosure may be a radio access network (RAN) node (or device) that accesses the user equipment to a wireless network. The base station may broadly cover various names in the following, or may be replaced with the following names, for example, a node B (NodeB), an evolved NodeB (eNB), a next generation NodeB (gNB), a relay station, an access point, a transmitting and receiving point (TRP), a transmitting point (TP), a master station (MeNB), a secondary station (SeNB), a multistandard radio (MSR) node, a femtocell, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node or the like, or a combination thereof. The base station may further refer to a communication module, a modem, or a chip disposed in the foregoing device or apparatus. The base station may also be a mobile switching center, a device that performs functions of the base station in D2D, V2X, machine-to-machine (M2M) communications, a network-side device in a 6G network, a device that performs the functions of the base station in a future communication system, and the like. The base station may support networks of the same or different access technologies. Specific technologies and specific device forms used by the network device are not limited in the embodiments of the present disclosure.

The base station may be fixed or mobile. For example, a helicopter or an unmanned aerial vehicle may be configured to act as a mobile base station, and one or more cells may move according to a location of the mobile base station. In other examples, the helicopter or the unmanned aerial vehicle may be configured to act as a device in communication with another base station.

In some deployments, the network device in the embodiments of the present disclosure may be a CU or a DU, or the network device includes the CU and the DU. The gNB may also include the AAU.

The network device and the user equipment may be deployed on land, including indoor or outdoor, and handheld or vehicle-mounted, may also be deployed on a water surface, or may be deployed on an aircraft, a balloon, and a satellite in the air. A scenario in which the network device and the user equipment are located is not limited in the embodiments of the present disclosure.

It should be understood that all or some functions of the communication device in the present disclosure may also be implemented by functions of a software running on a hardware, or may be implemented by using virtualization functions instantiated on a platform (for example, a cloud platform).

Coverage Enhancement of PRACH Transmission

The coverage performance of a communication system (for example, the NR system) is an important factor that needs to be considered when an operator performs commercialized deployment of a communication network, because the coverage performance of the communication system directly affects the service quality of the communication system and the cost of the operator, such as a capital expenditure (CAPEX) of the operator, an operating cost (OPEX) of the operator, and the like.

The coverage performance of the communication system varies with a frequency band at which the communication system operates. For example, the NR system operates at a higher frequency (for example, a millimeter wave frequency band) compared to the LTE system, resulting in a greater path loss of the NR system, which results in a relatively poor coverage performance of the NR system. Therefore, as the frequency band supported by the communication system may become higher and higher, how to perform coverage enhancement on the communication system becomes a problem to be solved.

In most scenarios of actual deployment, because the capability of the user equipment is weaker compared to the capability of the network device, the coverage performance of the uplink is a bottleneck for performing coverage enhancement on the communication system. With the development of communication technologies, uplink services in some emerging vertical use cases are also gradually increased, such as video uploading services, and how to perform uplink coverage enhancement in a scenario of more uplink services is a problem to be further solved.

In the related technologies, there is a technical solution of coverage enhancement for some uplink links. For example, a release 17 (Rel-17) of NR has designed a coverage enhancement scheme for a physical uplink shared channel (PUSCH), a physical uplink control channel (PUCCH), and a message 3 (Msg 3) in a random access procedure.

However, Rel-17 does not cover a coverage enhancement scheme for the PRACH, but the PRACH transmission (or referred to as PRACH transmission, and the following is described by taking the PRACH transmission as an example, but the PRACH transmission mentioned in the present disclosure may be replaced with the PRACH transmission) performance is very important for many procedures such as initial access and beam failure recovery, and therefore, it is also very important to perform coverage enhancement on the PRACH. Based on this, Rel-18 formally holds a 'further NR coverage enhancement' work item (WI), where enhancing the coverage performance of the PRACH transmission is one of the important issues of the WI.

As a possible implementation, coverage enhancement of PRACH transmission may be performed by using multiple PRACH transmissions. That is, coverage enhancement of PRACH transmission may be implemented by repeated transmission of the PRACH (for example, a preamble is sent in the PRACH for multiple times). It should be noted that, in the present disclosure, multiple PRACH transmissions may also be replaced with terms such as PRACH multi-transmission, multiple PRACH transmissions, and PRACH multi-transmissions, which is not limited in the embodiments of the present disclosure. In other words, the multiple PRACH transmissions mentioned in the present disclosure may be replaced with at least one of the PRACH multi-transmission, multiple PRACH transmissions, or PRACH multi-transmissions.

In the embodiments of the present disclosure, the multiple PRACH transmissions may refer to multiple PRACH transmissions using the same beam, or may refer to multiple PRACH transmissions using different beams. Taking the multiple PRACH transmissions using the same beam as an example, a 3$^{rd}$ generation partnership project (3GPP) radio access network (RAN) 1 #110bis-e conference has reached an agreement, i.e., PRACH occasions (or referred to as RACH occasions) at least in different time instances may be used for the multiple PRACH transmissions using the same beam. In addition, the RAN1 #110bis-e conference further defines the number of multiple PRACH transmissions (the number/repetition factor of the multiple PRACH transmissions) that use the same beam, and the number may include at least 2, 4, and 8.

Association Mapping of Synchronization Signal Blocks and PRACH Occasions

The synchronization signal block is a signal structure defined in the communication standard, and may include a primary synchronization signal (PSS), a secondary synchronization signal (SSS), and a physical broadcast channel (PBCH). In some embodiments, the synchronization signal block may be represented as SSB. In some embodiments, the synchronization signal block may also be represented as an SS/PBCH block (i.e., synchronization signal/physical broadcast channel block), that is, the synchronization signal block may also be referred to as a synchronization signal broadcast channel block, which is not limited in the embodiments of the present disclosure. It should be noted that the following is described by taking the synchronization signal block as the SSB as an example, and certainly, the following SSB may be replaced with the SS/PBCH block.

The SSB is a group of resources transmitted on a basic orthogonal frequency multiplexing grid, and the group of resources may include, for example, one or more of a time resource, a frequency resource, a code domain resource, and the like.

In an initial access or beam failure recovery process of the user equipment, when the user equipment detects the SSB sent by the network device, an SSB index of the SSB may be obtained, so that a time domain position where the SSB is located may be obtained, so as to implement downlink synchronization with the network device. In order to implement uplink synchronization, the user equipment needs to send a random access preamble to the network device (for brevity, hereinafter referred to as a preamble). How the user equipment selects the preamble to be sent as well as at which PRACH occasion the selected preamble should be sent is determined by the user equipment based on the received (or detected) SSB.

As a feasible technical solution, the SSB may be mapped to at least one preamble in at least one PRACH occasion, so that the user equipment may determine the associated PRACH occasion and preamble according to the received SSB when performing the initial access or beam failure recovery, so as to continue to perform the PRACH transmission.

In some implementations, the SSBs may be mapped to the PRACH occasions in the following order: first, in increasing order of preamble indexes in a single PRACH occasion; second, in increasing order of frequency resource indexes for frequency multiplexed (or frequency division multiplexed) PRACH occasions; third, in increasing order of time resource indexes for time multiplexed PRACH occasions within a PRACH slot; and finally, in increasing order of indexes for PRACH slots.

Random Access Occasion Group

In some scenarios, a PRACH occasion group (ROG) is introduced to indicate a group including a plurality of PRACH occasions (RO), and therefore, the ROG may also be referred to as an 'RO group'. A name of ROG is not limited in the embodiments of the present disclosure. For ease of description, the embodiments of the present disclosure are described based on ROG. A name of the physical random access channel occasion is not limited in the embodiments of the present disclosure, for example, the physical random access channel occasion may also be referred to as a random access occasion. For ease of description, the embodiments of the present disclosure are described based on the physical random access channel occasion, and the physical random access channel occasion and the random access occasion mentioned in the embodiments of the present disclosure may be replaced with each other.

In one embodiment, the ROG may include ROs corresponding to a plurality of PRACHs that are transmitted using the same beam.

In one embodiment, as discussed in some conferences (e.g., 3GPPRAN1 #110bis-e), ROs in different time instances may be used for the plurality of PRACH transmissions using the same beam.

In one embodiment, for a particular number of PRACH transmissions, one ROG includes valid ROs, which facilitates a particular number of PRACHs to transmit through the valid ROs.

In one embodiment, all the ROs in one ROG may be associated with one SSB. Certainly, in the embodiments of the present disclosure, one ROG may be associated with a plurality of SSBs.

Random Access Response Window (RAR Window)

The user equipment may monitor an RAR in an RAR window subsequently after transmitting the random access preamble. If the user equipment does not monitor or does not receive the RAR in the RAR window, it means that the user equipment fails to access.

In one embodiment, a size and/or position of the RAR window is configured (determined) by the network side. In other words, the network side may determine a length of the RAR window and/or the start of the RAR window. For example, the network side may configure the length of the RAR window and/or the start of the RAR window for the user equipment through higher layer signaling.

In one embodiment, the start of the RAR window may be at a first multicarrier symbol of an earliest control resource set (CORESET) that the user equipment is configured to receive, and the multicarrier symbol is spaced apart from a last multicarrier symbol of the corresponding RO by at least one multicarrier symbol. For example, in a single PRACH transmission solution, the start of the RAR window may be at the first multicarrier symbol of the earliest CORESET that the user equipment is configured to receive.

In one embodiment, the length of the RAR window may be configured as a uniform value, that is, the length of the RAR window may be a uniformly configured value (e.g., X). In this case, any random access attempt (RACH attempt) may adopt the uniformly configured value.

In one embodiment, a uniformly configured length of the RAR window may be X times of a slot.

In one embodiment, as discussed in some conferences (e.g., the 3GPPRAN1 #112 conference), for a plurality of PRACH transmissions in a RACH attempt, only one RAR window may be supported for RAR monitoring. In other words, the network does not separately configure the RAR window for each PRACH transmission in the plurality of PRACH transmissions, or the plurality of PRACH transmissions may share one RAR window.

In one embodiment, for a plurality of PRACH transmissions in a RACH attempt, methods of determining starts of the RAR windows may be different.

In one embodiment, in the plurality of PRACH transmissions solution, the start of the RAR window may be after a last multicarrier symbol of a last RO in the plurality of PRACH transmissions. In this case, the user equipment needs to wait until the plurality of PRACHs have been sent before starting to perform RAR monitoring, and therefore, this solution may obtain a combined detection gain of the plurality of PRACH transmissions.

In one embodiment, the start of the RAR window may be after a last multicarrier symbol of a first RO in the plurality of PRACH transmissions. In this case, the user equipment does not need to wait for all PRACHs in the plurality of PRACH transmissions to be transmitted. When some of the plurality of PRACH transmissions have been correctly received by the network side, the user equipment may early terminate the plurality of PRACH transmissions in order to reduce the random access delay while avoiding occupying additional PRACH resources, thereby reducing the probability of collision.

Currently, the user equipment may monitor control signaling (e.g., RAR) sent by the network side in a time window (e.g., an RAR window) subsequently after sending the random access preamble. For a plurality of PRACH transmissions in a random access attempt, how the length of the time window is determined is a problem that needs to be resolved.

As a possible implementation, the length of the time window may be configured for the plurality of PRACH transmissions in a unified manner. However, the uniformly configured length of the time window may not meet the configuration requirements of the plurality of PRACH transmissions. For example, when the uniformly configured length of the time window is short, for a plurality of PRACH transmissions with a relatively large number of PRACHs, the detection performance of the plurality of PRACH transmissions may be affected. Alternatively, when the uniformly configured length of the time window is long, for a plurality of PRACH transmissions with a relatively small number of PRACHs, a relatively large random access delay may be caused. This is described in detail below with reference to FIG. 2 and FIG. 3, respectively.

Figure 2:
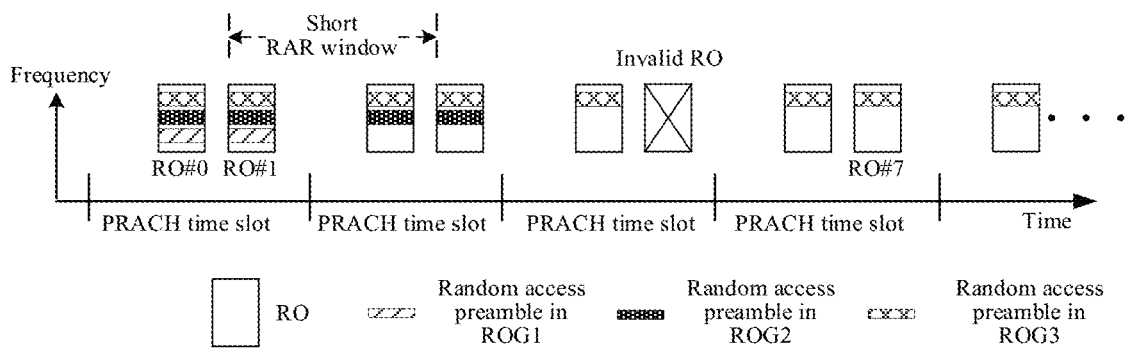
FIG. 2 is an example of a configured short time window.

FIG. 2 shows an example of a configured short time window. In the example of FIG. 2, the configured length of the time window is short, and in this case, for a plurality of PRACH transmissions with a relatively large number of PRACHs, an expiration time of the time window cannot cover the last RO, resulting in the user equipment stopping monitoring the control signaling, e.g., stopping monitoring a message 2 (Msg 2), before the user equipment has transmitted a later PRACH transmission, therefore the expected detection effect cannot be achieved.

Figure 3:
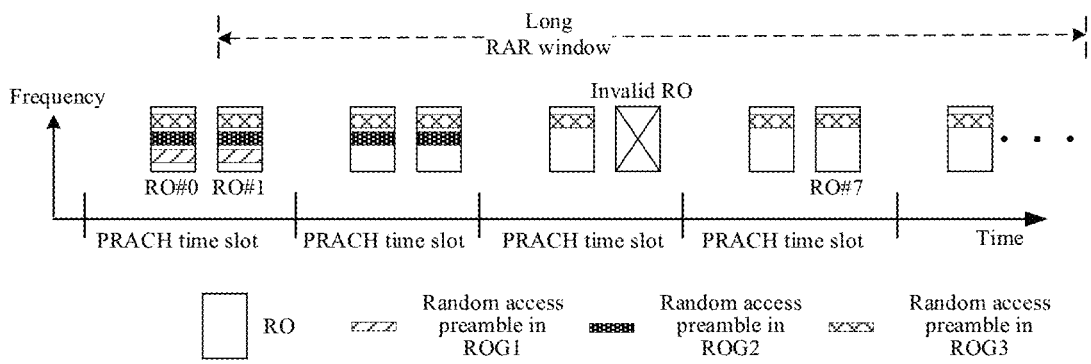
FIG. 3 is an example of a configured long time window.

FIG. 3 illustrates one example of a configured long time window. In the example of FIG. 3, the configured length of the time window is long, and in this case, for a plurality of PRACH transmissions with a relatively small number of PRACHs, the user equipment needs to wait until the time window is expired before performing a next operation, resulting in a relatively large random access delay.

Or the plurality of PRACH transmissions with the relatively large number of PRACHs may be more likely to encounter an invalid RO, and in order to meet a requirement of the number of valid ROs, a time span of the plurality of PRACH transmissions may be elongated, so that the uniformly configured length of the time window is further elongated.

Or the uniformly configured length of the time window may cause poor performance of the plurality of PRACH transmissions, so as to cause the PRACH transmission to become a bottleneck of a coverage of a communication system (e.g., an NR system).

In summary, how the length of the time window corresponding to the plurality of PRACHs is determined is a problem to be solved.

In view of the foregoing problems, embodiments of the present disclosure provide a method applied at a node for wireless communication and an apparatus, which can determine a length of a corresponding time window according to the number of PRACHs, so as to achieve one or more of the following objectives, i.e., meeting configuration requirements of the time windows of the plurality of PRACH transmissions with different PRACH numbers; or increasing the performance gain of the plurality of PRACH transmissions; or increasing the coverage of the communication system; or reducing the random access delay; or improving the utilization efficiency of the random access resource.

The present disclosure may be applied to a plurality of PRACH transmission scenarios, that is, a plurality of PRACHs may be repeatedly transmitted to implement PRACH coverage enhancement.

The present disclosure provides a plurality of application scenarios, for example, may be applied to an application scenario in which the start of a time window is determined in various manners. In one embodiment, in the technical solution of the present disclosure, the start of the time window (i.e., the first time window mentioned below) may be after a last multicarrier symbol of a last RO in the plurality of PRACH transmissions. In one embodiment, in the technical solution of the present disclosure, the start of the time window (i.e., the first time window mentioned below) may be after a last multicarrier symbol of a first RO in the plurality of PRACH transmissions.

In one embodiment, the plurality of PRACH transmissions mentioned in the present disclosure may refer to a plurality of PRACH transmissions using the same beam, to obtain a signal to noise ratio (SNR) gain by performing repeated transmission of a plurality of PRACHs on the same beam.

In one embodiment, the plurality of PRACH transmissions mentioned in the present disclosure may refer to a plurality of PRACH transmissions using different beams, to obtain a diversity gain by performing repeated transmission of the plurality of PRACHs on different beams.

The method and apparatus provided in the present disclosure are described below through a plurality of embodiments or examples. It should be understood that, in the case of no conflict, the embodiments and the features in the embodiments of the first node in the present disclosure may be applied to the second node, and vice versa. In the case of no conflict, the embodiments of the present disclosure and the features in the embodiments may be arbitrarily combined with each other.

Figure 4:
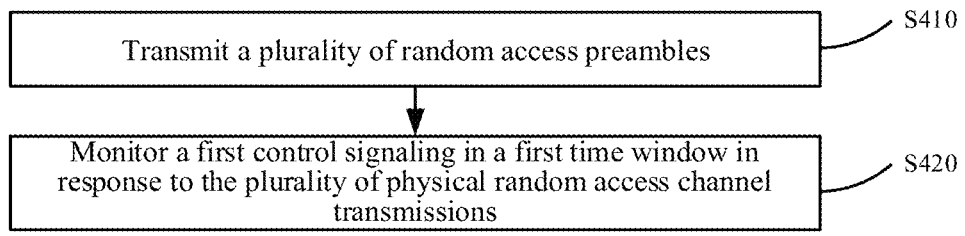
FIG. 4 is a schematic flowchart of a method applied at a first node for wireless communication according to an embodiment of the present disclosure.

FIG. 4 is a schematic flowchart of a method applied at a node for wireless communication according to embodiments of the present disclosure. The method shown in FIG. 4 may be performed by a first node. The first node may be any type of node capable of transmitting a random access preamble in the communication system.

In one embodiment, the first node may be a user equipment, e.g., the user equipment 120 shown in FIG. 1.

In one embodiment, the first node may be a network-controlled repeater (NCR).

In one embodiment, the first node may be a relay, e.g., a relay terminal.

In one embodiment, the first node includes a first transmitter and a first receiver.

Referring to FIG. 4, the method shown in FIG. 4 may include operations S410 and S420, which are described below.

In operation S410, a plurality of random access preambles are transmitted.

In one embodiment, the plurality of random access preambles are respectively transmitted on a plurality of PRACHs.

In one embodiment, a plurality of PRACH occasions are used for transmission of the plurality of random access preambles. In other words, the plurality of random access preambles are respectively transmitted on the plurality of PRACH occasions.

In one embodiment, the plurality of random access preambles are respectively transmitted on the plurality of PRACH occasions on the plurality of PRACHs.

In the present disclosure, the plurality of PRACH occasions respectively correspond to a plurality of PRACH transmissions, or in the present disclosure, the plurality of random access preambles respectively correspond to the plurality of PRACH transmissions.

It should be noted that, in the present disclosure, the plurality of PRACH occasions respectively corresponding to the plurality of PRACH transmissions may include or be replaced with at least one of the following: the plurality of random access preambles respectively corresponding to the plurality of PRACH transmissions; the plurality of PRACH occasions being respectively used for the plurality of PRACH transmissions; the plurality of random access preambles being respectively used for the plurality of PRACH transmissions; the plurality of PRACHs respectively corresponding to the plurality of PRACH transmissions; the plurality of PRACHs being respectively used for the plurality of PRACH transmissions; the plurality of PRACH transmissions including the plurality of random access preambles; the plurality of PRACH transmissions including transmitting the plurality of random access preambles; and the plurality of PRACH transmissions including respectively transmitting the plurality of random access preambles on the plurality of PRACHs.

In one embodiment, the plurality of random access preambles are transmitted by the first node through the first transmitter.

In one embodiment, the plurality of random access preambles are transmitted by the first node to a second node. The second node may be a network device. Certainly, the embodiments of the present disclosure are not limited thereto, for example, the plurality of random access preambles may be transmitted by another node other than the second node.

In one embodiment, the plurality of PRACH transmissions correspond to one random access attempt (RACH attempt, or PRACH attempt).

In one embodiment, the plurality of PRACH transmissions are used for one random access attempt.

In one embodiment, the plurality of PRACH transmissions include respectively transmitting the plurality of random access preambles on one random access attempt.

In operation S420, a first control signaling is monitored during a first time window in response to the plurality of PRACH transmissions.

In one embodiment, the first control signaling is monitored by the first receiver of the first node.

In one embodiment, a length of the first time window is related to a number of the plurality of PRACH transmissions.

In one embodiment, the length of the first time window being related to the number of the plurality of PRACH transmissions may include or may be replaced with the number of the plurality of PRACH transmissions being used to determine the length of the first time window.

In one embodiment, the number of the plurality of PRACH transmissions refers to a number of PRACH transmissions in the plurality of PRACH transmissions.

In one embodiment, the number of the plurality of PRACH transmissions is equal to a number of the plurality of PRACHs. In other words, the length of the first time window is related to the number of the plurality of PRACHs, or the number of the plurality of PRACHs is used to determine the length of the first time window.

In one embodiment, the number of the plurality of PRACH transmissions is equal to a number of the plurality of random access preambles. In other words, the length of the first time window is related to the number of the plurality of random access preambles, or the number of the plurality of random access preambles is used to determine the length of the first time window.

In one embodiment, the number of the plurality of PRACH transmissions is equal to a number of random access preambles in the plurality of random access preambles respectively transmitted on the plurality of PRACHs. In other words, the length of the first time window is related to the number of random access preambles in the plurality of random access preambles respectively transmitted on the plurality of PRACHs, or the number of the random access preambles in the plurality of random access preambles respectively transmitted on the plurality of PRACHs is used to determine the length of the first time window.

In the embodiments of the present disclosure, the length of the first time window can be determined according to the number of the plurality of PRACH transmissions, so as to meet the configuration requirements of the time windows of the plurality of PRACH transmissions with different PRACH numbers, or improve the performance gains of the plurality of PRACH transmission, or increase the coverage of the communication system, or reduce the random access delay, or improve the utilization efficiency of the random access resources.

In one embodiment, the length of the first time window is determined by a first node according to a length of a candidate time window configured by a network side and the number of the plurality of PRACH transmissions. How the first node determines the length of the first time window will be described in detail below, which are not described herein again.

In one embodiment, the user equipment may transmit a random access preamble during the first time window to request an access network, and the network side may reply a response before the end of the first time window, so that the user equipment establishes a connection with the network side. Such a random access mechanism may help reduce network congestion and collision, and improve network efficiency and reliability.

A time domain unit of the first time window is not limited in the embodiments of the present disclosure. In one embodiment, the time domain unit of the first time window may be a slot. In one embodiment, the time domain unit of the first time window may be a multicarrier symbol.

In other words, a granularity of the first time window is not limited in the embodiments of the present disclosure. In one embodiment, the granularity of the first time window is a slot. In one embodiment, the granularity of the first time window is a multicarrier symbol.

A manner of representing the length of the first time window is not specifically limited in the embodiments of the present disclosure. In one embodiment, the length of the first time window may be represented by a slot. In one embodiment, the length of the first time window may be represented by a multicarrier symbol. In one embodiment, the length of the first time window may be represented by a subframe. In one embodiment, the length of the first time window may be represented by milliseconds. In one embodiment, the length of the first time window may be represented by seconds. It should be noted that the above-mentioned representation manner is only an example, and the length of the first time window may also be represented in other manners which are not enumerated.

The length of the first time window is not specifically limited in the embodiments of the present disclosure. The following uses an example in which the length of the first time window uses the slot or milliseconds for description.

In one embodiment, the length of the first time window includes at least one slot, e.g., including 5 slots, 10 slots, and the like. In other words, the length of the first time window includes a plurality of slots, e.g., including two or more slots.

In one embodiment, the length of the first time window is less than or equal to 10 milliseconds.

In one embodiment, the length of the first time window is less than or equal to 40 milliseconds.

Certainly, the length of the first time window may also be other values, which is not limited in the embodiments of the present disclosure.

In one embodiment, the first time window starts after a last multicarrier symbol of a last random access occasion among the plurality of PRACH transmissions.

In one embodiment, the first time window starts after a last multicarrier symbol of a last PRACH occasion of the plurality of PRACH occasions.

In one embodiment, the first time window starts after a last multicarrier symbol of a last random access occasion among a plurality of random access occasions included in a first random access occasion group, and a plurality of random access occasions included in the first random access occasion group respectively correspond to the plurality of PRACH transmissions. For a detailed description of the first random access occasion group, reference can be made to the following descriptions.

In one embodiment, the first time window starts after a last multicarrier symbol of a first random access occasion among the plurality of PRACH transmissions.

In one embodiment, the first time window starts after a last multicarrier symbol of a first PRACH occasion of the plurality of PRACH occasions.

In one embodiment, the first time window starts after a last multicarrier symbol of a first random access occasion of a plurality of random access occasions included in a first random access occasion group, and a plurality of random access occasions included in the first random access occasion group respectively correspond to the plurality of PRACH transmissions.

In one embodiment, the first time window is a random access response window (RAR window).

In one embodiment, the first time window is used for receiving a random access response (RAR).

In one embodiment, the first time window being used for receiving the random access response may include or be replaced with: monitoring the random access response during the first time window.

In one embodiment, the random access response includes a first control signaling. In other words, the first time window may be used to receive the first control signaling in the random access response, or monitor the first control signaling in the random access response during the first time window.

In one embodiment, the first time window is used for receiving a message 2 in a random access operation.

In one embodiment, the first time window being used for receiving the message 2 in the random access operation may include or be replaced with: monitoring the message 2 during the first time window.

In one embodiment, the message 2 includes the first control signaling. In other words, the first time window may be used to receive the first control signaling in the message 2, or monitor the first control signaling in the message 2 during the first time window.

A specific form of the first control signaling is not limited in the embodiments of the present disclosure, and the first control signaling is described in detail below.

In one embodiment, the first control signaling is scrambled to ensure security and reliability of data transmission. For example, the first control signaling is scrambled by a first RNTI. The following describes in detail that the first control signaling is scrambled by the first RNTI, and for brevity, details are not described herein again.

In one embodiment, the first control signaling is transmitted by a second node to the first node, and the second node may be a network device.

In one embodiment, the first control signaling includes downlink control information (DCI).

In one embodiment, the first control signaling is DCI.

In one embodiment, the first control signaling includes a DCI format.

In one embodiment, the first control signaling includes the DCI format and a cyclic redundancy check (CRC).

In one embodiment, the first control signaling includes the DCI format the CRC, and the CRC is scrambled by the first RNTI. The following will describe the first RNTI in detail, which is not described herein.

In one embodiment, in a case that the first control signaling includes DCI, the DCI format is not specifically limited in this embodiment of the present disclosure. For example, the first control signaling may include a DCI format 1_0, or the first control signaling may include other DCI formats, such as a DCI format 2_0, etc.

In one embodiment, the first control signaling includes the DCI Format 1_0 and the CRC.

In one embodiment, the first control signaling includes the DCI Format 1_0 and the CRC, and the CRC is scrambled by the first RNTI.

It should be noted that the first control signaling may include signaling other than DCI, which is not limited in the embodiments of the present disclosure.

In one embodiment, the first control signaling includes high layer signaling, or the first control signaling includes higher layer signaling.

The high layer signaling or higher layer signaling is not limited in the embodiments of the present disclosure. In one embodiment, the first control signaling includes radio resource control (RRC) layer signaling. In one embodiment, the first control signaling includes medium access control (MAC) layer signaling.

The foregoing describes a case in which the plurality of PRACH transmissions correspond to the plurality of random access preambles, and the following describes the plurality of PRACH transmissions and the plurality of random access occasions.

In one embodiment, a first random access occasion group includes a plurality of random access occasions, and the plurality of random access occasions respectively correspond to the plurality of PRACH transmissions.

In one embodiment, the plurality of random access occasions included in the first random access occasion group are respectively used for the plurality of PRACH transmissions.

In one embodiment, the plurality of random access occasions included in the first random access occasion group are used for a random access attempt.

In one embodiment, a plurality of random access occasions included in the first random access occasion group are respectively used for transmitting the plurality of random access preambles.

In one embodiment, a number of the plurality of random access occasions included in the first random access occasion group may be one of 2, 4, and 8. Certainly, in this embodiment of the present disclosure, the number of the plurality of random access occasions included in the first random access time group may also be another number, which is not limited in this embodiment of the present disclosure.

In one embodiment, a plurality of random access occasions included in the first random access occasion group respectively include the plurality of PRACHs.

In one embodiment, the plurality of PRACHs are respectively on the plurality of random access occasions included in the first random access occasion group.

In one embodiment, a number of the plurality of PRACH transmissions is equal to a number of a plurality of random access occasions included in the first random access occasion group.

It should be noted that, in the present disclosure, the number of the plurality of random access occasions included in the first random access occasion group may include or be replaced with at least one of the number of the plurality of random access preambles transmitted in the first random access occasion group and the number of PRACH transmissions in the plurality of PRACH transmissions performed based on the first random access occasion group.

It should be noted that, in the present disclosure, the plurality of random access occasions may include or be replaced with at least one of the following: a plurality of PRACH occasions, a plurality of RACH occasions, and a plurality of PRACH transmission occasions.

In one embodiment, the plurality of random access occasions included in the first random access occasion group are time-division multiplexing (TDM).

In one embodiment, at least two random access occasions in the plurality of random access occasions included in the first random access occasion group are different in a start position of a frequency domain.

In one embodiment, any two random access occasions in the plurality of random access occasions included in the first random access occasion group are the same in a start position of a frequency domain.

A frequency domain unit of each of any two random access occasions in the plurality of random access occasions included in the first random access occasion group in a frequency domain is not limited in the embodiments of the present disclosure. In one embodiment, a frequency domain unit of each of any two random access occasions in a frequency domain may be a resource block (RB). In one embodiment, a frequency domain unit of each of any two random access occasions in a frequency domain may be a resource element (RE).

In one embodiment, any one of the plurality of random access occasions included in the first random access occasion group occupies one RB in a frequency domain. Certainly, in this embodiment of the present disclosure, one of the plurality of random access occasions included in the first random access occasion occupies one RB in the frequency domain, which is not limited in this embodiment of the present disclosure.

In one embodiment, any one of the plurality of random access occasions included in the first random access occasion group occupies a plurality of RBs in a frequency domain. Certainly, in this embodiment of the present disclosure, one of the plurality of random access occasions included in the first random access occasion occupies a plurality of RBs in the frequency domain, which is not limited in this embodiment of the present disclosure.

In one embodiment, any one of the plurality of random access occasions included in the first random access occasion group includes at least one multicarrier symbol in a time domain, and/or the any one of the plurality of random access occasions includes at least one RB in a frequency domain.

In one embodiment, one of the plurality of random access occasions included in the first random access occasion group includes at least one multicarrier symbol in a time domain, and/or the one of the plurality of random access occasions includes at least one RB in a frequency domain. Certainly, in this embodiment of the present disclosure, a granularity of a time-frequency resource occupied by the random access occasion is not limited.

In one embodiment, a plurality of random access occasions included in the first random access occasion group belong to a plurality of PRACH slots. For example, each of the plurality of random access occasions included in the first random access occasion belongs to a respective one of the plurality of PRACH slots. For another example, some of the plurality of random access occasions included in the first random access occasion belong to a respective one of the plurality of PRACH slots.

In one embodiment, any one of the plurality of random access occasions included in the first random access occasion group occupies a plurality of multicarrier symbols in a time domain. Certainly, in this embodiment of the present disclosure, one of the plurality of random access occasions included in the first random access occasion occupies a plurality of multicarrier symbols in the time domain.

In one embodiment, any one of the plurality of random access occasions included in the first random access occasion group occupies a plurality of uplink symbols in a time domain. Certainly, in this embodiment of the present disclosure, one of the plurality of random access occasions included in the first random access occasion occupies a plurality of uplink symbols in the time domain.

In one embodiment, any one of the plurality of random access occasions included in the first random access occasion group belongs to one PRACH slot in a time domain. Certainly, in this embodiment of the present disclosure, one of the plurality of random access occasions included in the first random access occasion belongs to one PRACH slot in a time domain, which is not limited in this embodiment of the present disclosure.

In one embodiment, all of the plurality of random access occasions included in the first random access occasion belong to one PRACH slot in a time domain. Certainly, in this embodiment of the present disclosure, some of the plurality of random access occasions included in the first random access occasion belong to one PRACH slot in the time domain, which is not limited in this embodiment of the present disclosure.

As mentioned above, the first control signaling is scrambled by the first RNTI, which will be described in detail below.

In one embodiment, the first RNTI is associated with the plurality of PRACH occasions.

In one embodiment, the first RNTI is an RNTI corresponding to the plurality of PRACH occasions.

In one embodiment, a CRC of the first control signaling is scrambled by the first RNTI.

The implementation of the first RNTI is not specifically limited in the embodiments of the present disclosure, as long as the first RNTI can be used to uniquely identify one user equipment, so that the malicious attacker is prevented from interfering with the network communication through a counterfeit RNTI identifier. In other words, in the present disclosure, first RNTIs each corresponding to a respective one of the user equipments are different, so as to distinguish different user equipments. The following describes an exemplary description of the first RNTI.

In one embodiment, the first RNTI is one RNTI.

In one embodiment, the first RNTI includes a random access-RNTI (RA-RNTI). In other words, the first RNTI includes a four-step random access RNTI.

In one embodiment, the first RNTI includes a message B-RNTI. In other words, the first RNTI includes a two-step random access RNTI.

In one embodiment, the first RNTI is associated with the plurality of PRACH transmissions.

In one embodiment, the first RNTI is associated with the first random access occasion group.

In one embodiment, the first RNTI is associated with one of the plurality of random access occasions included in the first random access occasion group. For example, the first RNTI may be associated with any one of the plurality of random access occasions included in the first random access occasion group.

In one embodiment, the first RNTI is associated with a first one of the plurality of random access occasions included in the first random access occasion group.

In one embodiment, the first RNTI is associated with a last one of the plurality of random access occasions included in the first random access occasion group.

In one embodiment, the first RNTI is associated with a first one, in a time domain, of the plurality of random access occasions included in the first random access occasion group.

In one embodiment, the first RNTI is associated with a last one, in a time domain, of the plurality of random access occasions included in the first random access occasion group.

In one embodiment, the first RNTI is associated with a reference random access occasion. The following describes an exemplary description of the reference random access occasion.

In one embodiment, the reference random access occasion is one of the plurality of random access occasions included in the first random access occasion group. For example, the reference random access occasion may be any one of the plurality of random access occasions included in the first random access occasion group.

In one embodiment, the reference random access occasion is a first one, in a time domain, of the plurality of random access occasions included in the first random access occasion group.

In one embodiment, the reference random access occasion is a last one, in a time domain, of the plurality of random access occasions included in the first random access occasion group.

However, the present disclosure is not limited thereto, and the reference random access occasion may be a random access occasion other than the plurality of random access occasions included in the first random access occasion group. For example, the reference random access occasion may be any random access occasion other than the plurality of random access occasions included in the first random access occasion group.

The relationship between a length of the first time window and a number of the plurality of PRACH transmissions is described in detail below, and how to determine the length of the first time window according to the number of the plurality of PRACH transmissions is exemplarily described. The relationship between the length of the first time window and the number of the plurality of PRACH transmissions is first introduced.

In one embodiment, the length of the first time window is linearly related to the number of the plurality of PRACH transmissions. That is, the length of the first time window may vary linearly with the number of the plurality of PRACH transmissions.

In one embodiment, the length of the first time window increases or remains unchanged as the number of the plurality of PRACH transmissions increases. For example, the length of the first time window increases as the number of the plurality of PRACH transmissions increases. Alternatively, the length of the first time window remains unchanged as the number of the plurality of PRACH transmissions increases.

Alternatively, the length of the first time window decreases or remains unchanged as the number of the plurality of PRACH transmissions decreases. For example, the length of the first time window decreases as the number of the plurality of PRACH transmissions decreases. Alternatively, the length of the first time window remains unchanged as the number of the plurality of PRACH transmissions decreases.

In one embodiment, the length of the first time window is proportional to the number of the plurality of PRACH transmissions. For example, in a case that the length of the first time window increases as the number of the plurality of PRACH transmissions increases, the length of the first time window increases directly proportional to the number of the plurality of PRACH transmissions. Alternatively, in a case that the length of the first time window decreases as the number of the plurality of PRACH transmissions decreases, the length of the first time window decreases directly proportional to the number of the plurality of PRACH transmissions.

In one embodiment, the length of the first time window is linearly related to a number of the plurality of random access occasions included in the first random access occasion group.

In one embodiment, the length of the first time window increases or remains unchanged as the number of the plurality of random access occasions included in the first random access occasion group increases.

In one embodiment, the length of the first time window increases as the number of the plurality of random access occasions included in the first random access occasion group increases.

In one embodiment, the length of the first time window remains unchanged as the number of the plurality of random access occasions included in the first random access occasion group increases.

In one embodiment, the length of the first time window decreases or remains unchanged as the number of the plurality of random access occasions included in the first random access occasion group decreases.

In one embodiment, the length of the first time window decreases as the number of the plurality of random access occasions included in the first random access occasion group decreases.

In one embodiment, a length of the first time window remains unchanged as the number of the plurality of random access occasions included in the first random access occasion group decreases.

In one embodiment, the length of the first time window is proportional to the number of the plurality of random access occasions included in the first random access occasion group. For example, in a case that the length of the first time window increases as the number of the plurality of random access occasions included in the first random access occasion group increases, the length of the first time window increases directly proportional to the number of the plurality of random access occasions included in the first random access occasion group. Alternatively, in a case that the length of the first time window decreases as the number of the plurality of random access occasions included in the first random access occasion group decreases, the length of the first time window decreases directly proportional to the number of the plurality of random access occasions included in the first random access occasion group.

In this way, in the embodiments of the present disclosure, for a plurality of PRACH transmissions with more PRACH numbers, the first node can select a longer length of the first time window, which is beneficial to ensuring effective detection of the plurality of PRACHs, and for a plurality of PRACH transmissions with fewer PRACH numbers, the first node can select a shorter length of the first time window, which is beneficial to reducing the random access delay.

In one embodiment, the number of the plurality of random access occasions included in the first random access occasion group is equal to the number of the plurality of PRACH transmissions.

In one embodiment, the number of the plurality of random access occasions included in the first random access occasion group is equal to the number of the plurality of PRACHs.

In one embodiment, the number of the plurality of random access occasions included in the first random access occasion group is equal to the number of the plurality of random access preambles.

It should be noted that, in the embodiments of the present disclosure, the number of the plurality of random access occasions included in the first random access occasion group may include or be replaced with at least one of the number of the plurality of PRACH transmissions, the number of the plurality of PRACHs, and the number of the plurality of random access preambles.

In one embodiment, the number of the plurality of random access occasions included in the first random access occasion group is used to determine the length of the first time window.

How to determine the length of the first time window based on the number of the plurality of PRACH transmissions is described below.

Implementation 1

In one embodiment, the length of the first time window is one of a plurality of candidate time lengths, the number of the plurality of PRACH transmissions is one of a plurality of candidate numbers, and the number of the plurality of PRACH transmissions is used to determine the length of the first time window from the plurality of candidate time lengths.

In one embodiment, the plurality of candidate time lengths are in one-to-one correspondence with the plurality of candidate numbers.

In one embodiment, one of the plurality of candidate time lengths corresponds to one or more of the plurality of candidate numbers. For example, one of the plurality of candidate time lengths corresponds to at least two of the plurality of candidate numbers. In other words, one of the plurality of candidate time lengths is shared by one or more of the plurality of candidate numbers.

In one embodiment, the length of the first time window is one of the plurality of candidate time lengths, the number of the plurality of PRACH transmissions is one of the plurality of candidate numbers, and the plurality of candidate time lengths are in one-to-one correspondence with the plurality of candidate numbers or one of the plurality of candidate time lengths corresponds to one or more of the plurality of candidate numbers.

In one embodiment, the number of the plurality of PRACH transmissions is used to determine the length of the first time window from the plurality of candidate time lengths.

In one embodiment, the length of the first time window is one of the plurality of candidate time lengths, the number of the plurality of random access occasions included in the first random access occasion group is one of the plurality of candidate numbers, and the plurality of candidate time lengths are in one-to-one correspondence with the plurality of candidate numbers or one of the plurality of candidate time lengths corresponds to one or more of the plurality of candidate numbers. The number of the plurality of random access occasions included in the first random access occasion group is used to determine the length of the first time window from the plurality of candidate time lengths.

In one embodiment, the length of the first time window is one of the plurality of candidate time lengths, the number of the plurality of random access occasions included in the first random access occasion group is one of the plurality of candidate numbers, and the plurality of candidate time lengths are in one-to-one correspondence with the plurality of candidate numbers or one of the plurality of candidate time lengths corresponds to one or more of the plurality of candidate numbers. In other words, one of the plurality of candidate time lengths is shared by one or more of the plurality of candidate numbers.

In one embodiment, the number of the plurality of random access occasions included in the first random access occasion group is used to determine the length of the first time window from the plurality of candidate time lengths.

The number of the plurality of candidate time lengths is not specifically limited in the embodiments of the present disclosure, for example, the plurality of candidate time lengths may be two candidate time lengths, or may be three or more candidate time lengths.

In one embodiment, the plurality of candidate time lengths include a first time length and a second time length, and the first time length is different from the second time length.

In one sub-embodiment of the above embodiment, the first time length includes at least one time slot.

In one sub-embodiment of the above embodiment, the second time length includes at least one time slot.

However, the embodiments of the present disclosure are not limited thereto, and the granularity of the first time length and/or the granularity of the second time length may be in other forms, such as milliseconds, multicarrier symbols, and the like. For example, the first time length includes at least 1 millisecond, the second time length includes at least 1 millisecond, the first time length includes at least 14 multicarrier symbols, the second time length includes at least 14 multicarrier symbols, and so on.

In one sub-embodiment of the above embodiment, the first time length is less than the second time length.

In one sub-embodiment of the above embodiment, the first time length is greater than the second time length.

In one sub-embodiment of the above embodiment, the second time length is a multiple of the first time length. For example, the multiple may be an integer multiple, such as twice or three times. For another example, the multiple may be a multiple greater than 1, for example, twice or 2.5 times. For another example, the multiple may be a multiple greater than 0 and less than 1, for example, 0.5 times, 0.8 times, or the like.

In one sub-embodiment of the above embodiment, the second time length is a sum of the first time length and at least one time slot.

In one sub-embodiment of the above embodiment, the first time length includes one time slot.

In one sub-embodiment of the above embodiment, the second time length includes two time slots.

In one sub-embodiment of the above embodiment, the first time length includes 10 time slots, and the second time length includes 15 time slots.

In one sub-embodiment of the above embodiment, when the number of the plurality of PRACH transmissions is 2, the length of the first time window is the first time length; and when the number of the plurality of PRACH transmissions is 4, the length of the first time window is the second time length.

In one sub-embodiment of the above embodiment, when the first random access occasion group includes two random access occasions, the length of the first time window is the first time length; and when the first random access occasion group includes four random access occasions, the length of the first time window is the second time length.

In one sub-embodiment of the above embodiment, when the number of the plurality of PRACH transmissions is 2, the length of the first time window is the first time length; and when the number of the plurality of PRACH transmissions is 8, the length of the first time window is the second time length.

In one sub-embodiment of the above embodiment, when the first random access occasion group includes two random access occasions, the length of the first time window is the first time length; and when the first random access occasion group includes eight random access occasions, the length of the first time window is the second time length.

In one sub-embodiment of the above embodiment, when the number of the plurality of PRACH transmissions is 4, the length of the first time window is the first time length; and when the number of the plurality of PRACH transmissions is 8, the length of the first time window is the second time length.

In one sub-embodiment of the above embodiment, when the first random access occasion group includes four random access occasions, the length of the first time window is the first time length; and when the first random access occasion group includes eight random access occasions, the length of the first time window is the second time length.

In one sub-embodiment of the above embodiment, when the number of the plurality of PRACH transmissions is 2, the length of the first time window is the first time length; when the number of the plurality of PRACH transmissions is 4, the length of the first time window is the first time length; and when the number of the plurality of PRACH transmissions is 8, the length of the first time window is the second time length.

In one sub-embodiment of the above embodiment, when the first random access occasion group includes two random access occasions, the length of the first time window is the first time length; when the first random access occasion group includes four random access occasions, the length of the first time window is the first time length; and when the first random access occasion group includes eight random access occasions, the length of the first time window is the second time length.

In one sub-embodiment of the above embodiment, when the number of the plurality of PRACH transmissions is 2, the length of the first time window is the first time length; when the number of the plurality of PRACH transmissions is 4, the length of the first time window is the second time length; and when the number of the plurality of PRACH transmissions is 8, the length of the first time window is the second time length.

In one sub-embodiment of the above embodiment, when the first random access occasion group includes two random access occasions, the length of the first time window is the first time length; when the first random access occasion group includes four random access occasions, the length of the first time window is the second time length; and when the first random access occasion group includes eight random access occasions, the length of the first time window is the second time length.

In one embodiment, the plurality of candidate time lengths include a first time length, a second time length, and a third time length, and the first time length, the second time length, and the third time length are different.

In one sub-embodiment of the above embodiment, when the number of the plurality of PRACH transmissions is 2, the length of the first time window is the first time length; when the number of the plurality of PRACH transmissions is 4, the length of the first time window is the second time length; and when the number of the plurality of PRACH transmissions is 8, the length of the first time window is the third time length.

In one sub-embodiment of the above embodiment, when the first random access occasion group includes two random access occasions, the length of the first time window is the first time length; when the first random access occasion group includes four random access occasions, the length of the first time window is the second time length; and when the first random access occasion group includes eight random access occasions, the length of the first time window is the third time length.

Implementation 2

In one embodiment, the length of the first time window belongs to one of a plurality of candidate time length groups, any one of the plurality of candidate time length groups includes at least one time length, the number of the plurality of PRACH transmissions is one of the plurality of candidate numbers, and the number of the plurality of PRACH transmissions is used to determine a candidate time length group to which the length of the first time window belongs from the plurality of candidate time length groups.

In one embodiment, the plurality of candidate time length groups are in one-to-one correspondence with the plurality of candidate numbers.

In one embodiment, one of the plurality of candidate time-length groups corresponds to one or more of the plurality of candidate numbers. For example, one of the plurality of candidate time length groups corresponds to at least two of the plurality of candidate numbers. In other words, one of the plurality of candidate time length groups is shared by one or more of the plurality of candidate numbers.

In one embodiment, the length of the first time window belongs to one of the plurality of candidate time length groups, any one of the plurality of candidate time length groups includes at least one time length, the number of the plurality of PRACH transmissions is one of the plurality of candidate numbers, and the plurality of candidate time length groups are in one-to-one correspondence with the plurality of candidate numbers or one of the plurality of candidate time length groups corresponds to one or more of the plurality of candidate numbers.

In one embodiment, the number of the plurality of PRACH transmissions is used to determine a candidate time length group to which the length of the first time window belongs from the plurality of candidate time length groups.

In one embodiment, after the number of the plurality of PRACH transmissions is used to determine the candidate time length group to which the length of the first time window belongs from the plurality of candidate time length groups and if the candidate time length group, to which the length of the first time window belongs, determined according to the number of the plurality of PRACH transmissions includes only one time length, the length of the first time window may be the time length included in the candidate time length group to which the length of the first time window belongs. In an implementation, if the candidate time length group, to which the length of the first time window belongs, determined according to the number of the plurality of PRACH transmissions includes a plurality of time lengths, the length of the first time window may be further determined from the plurality of time lengths included in the candidate time length group to which the length of the first time window belongs according to the number of the plurality of PRACH transmissions. The method for determining the length of the first time window from the plurality of time lengths included in the candidate time length group to which the length of the first time window belongs according to the number of the plurality of PRACH transmissions can be referred to the above implementation 1, which is not repeated herein.

In one embodiment, the length of the first time window belongs to one of the plurality of candidate time length groups, any one of the plurality of candidate time length groups includes at least one time length, the number of the plurality of random access occasions included in the first random access occasion group is one of the plurality of candidate numbers, and the number of the plurality of random access occasions included in the first random access occasion group is used to determine the candidate time length group to which the length of the first time window belongs from the plurality of candidate time length groups.

In one embodiment, the plurality of candidate time-length groups are in one-to-one correspondence with the plurality of candidate numbers.

In one embodiment, one of the plurality of candidate time-length groups corresponds to one or more of the plurality of candidate numbers. For example, one of the plurality of candidate time length groups corresponds to at least two of the plurality of candidate numbers. In other words, one of the plurality of candidate time length groups is shared by one or more of the plurality of candidate numbers.

In one embodiment, the length of the first time window belongs to one of the plurality of candidate time length groups, any one of the plurality of candidate time length groups includes at least one time length, the number of the plurality of random access occasions included in the first random access occasion group is one of the plurality of candidate numbers, and the plurality of candidate time length groups are in one-to-one correspondence with the plurality of candidate numbers or one of the plurality of candidate time length groups corresponds to one or more of the plurality of candidate numbers.

In one embodiment, the number of the plurality of random access occasions included in the first random access occasion group is used to determine the candidate time length group to which the length of the first time window belongs from the plurality of candidate time length groups.

In one embodiment, after the number of the plurality of random access occasions included in the first random access occasion group is used to determine the candidate time length group to which the length of the first time window belongs from the plurality of candidate time length groups and if the candidate time length group, to which the length of the first time window belongs, determined according to the number of the plurality of random access occasions included in the first random access occasion group includes only one time length, the length of the first time window may be the time length included in the candidate time length group to which the length of the first time window belongs. In an implementation, if the candidate time length group, to which the length of the first time window belongs, determined according to the number of the plurality of random access occasions included in the first random access occasion group includes a plurality of time lengths, the length of the first time window may be further determined from the plurality of time lengths included in the candidate time length group to which the length of the first time window belongs according to the number of the plurality of random access occasions included in the first random access occasion group. The method for determining the length of the first time window from the plurality of time lengths included in the candidate time length group to which the length of the first time window belongs according to the number of the plurality of random access occasions included in the first random access occasion group can be referred to the above implementation 1, which is not repeated herein.

Implementation 3

In one embodiment, the first node can only receive one candidate time length, and in this case, the length of the first time window is determined according to the candidate time length and a first coefficient.

In one embodiment, the first coefficient is related to the number of the plurality of PRACH transmissions.

In one embodiment, the first coefficient is related to the number of the plurality of random access occasions included in the first random access occasion group.

In one embodiment, the first coefficient is determined according to the number of the plurality of PRACH transmissions.

In one embodiment, the first coefficient is determined according to the number of the plurality of random access occasions included in the first random access occasion group.

In one embodiment, the first coefficient is linearly related to the number of the plurality of PRACH transmissions.

In one embodiment, the first coefficient is linearly related to the number of the plurality of random access occasions included in the first random access occasion group.

In one embodiment, the first coefficient increases or remains unchanged as the number of the plurality of PRACH transmissions increases.

In one embodiment, the first coefficient increases or remains unchanged as the number of the plurality of random access occasions included in the first random access occasion group increases.

In one embodiment, the first coefficient increases as the number of the plurality of PRACH transmissions increases.

In one embodiment, the first coefficient increases as the number of the plurality of random access occasions included in the first random access occasion group increases.

In one embodiment, the first coefficient is proportional to the number of the plurality of PRACH transmissions.

In one embodiment, the first coefficient is proportional to the number of the plurality of random access occasions included in the first random access occasion group.

In one embodiment, the first coefficient is equal to the number of the plurality of PRACH transmissions.

In one embodiment, the first coefficient is equal to the number of the plurality of random access occasions included in the first random access occasion group.

In one embodiment, the first coefficient is equal to the number of PRACHs in the plurality of PRACH transmissions.

In one embodiment, the first coefficient is a positive integer. However, the embodiments of the present disclosure are not limited thereto, and the first coefficient may be any value, for example, a value greater than 0 and less than 1, or a non-integer greater than 1.

In one embodiment, the first coefficient includes at least one time slot. However, the embodiments of the present disclosure are not limited thereto, and the first coefficient may include at least one multicarrier symbol, at least one millisecond, and the like.

In one embodiment, the first coefficient is a fixed value. However, the embodiments of the present disclosure are not limited thereto. In some embodiments, the first coefficient may be a changed value.

In one embodiment, the first coefficient is configured by higher layer signaling. For example, the first coefficient is configured by RRC layer signaling, or the first coefficient is configured by MAC layer signaling. In other words, the first coefficient is carried in RRC signaling, or the first coefficient is carried in MAC CE signaling.

In one embodiment, the length of the first time window is equal to a sum of one candidate time length and the first coefficient.

In one embodiment, the length of the first time window is equal to a sum of one candidate time length and the first coefficient of time slots.

In one embodiment, the length of the first time window is equal to a product of one candidate time length and the first coefficient.

As mentioned above, the length of the first time window may be determined from the plurality of candidate time lengths, or may be determined according to one candidate time length. The following describes configurations of the plurality of candidate time lengths and/or one candidate time length.

Figure 5:
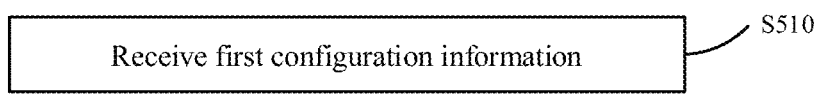
FIG. 5 is another schematic flowchart of a method applied at a first node for wireless communication according to an embodiment of the present disclosure.

FIG. 5 is another schematic flowchart of a method applied at a node for wireless communication according to an embodiment of the present disclosure. The method shown in FIG. 5 may be performed by the first node. The method shown in FIG. 5 may include operation S510.

At operation S510, first configuration information is received.

In one embodiment, the first configuration information may be received by a first receiver of the first node.

In one embodiment, the first configuration information may be sent by a second node. Certainly, in the embodiments of the present disclosure, the first configuration information may be sent by other nodes, which is not limited in the embodiments of the present disclosure.

In one embodiment, the first configuration information may be configured by higher layer signaling or high layer signaling. In other words, the first configuration information may be carried in higher layer signaling or high layer signaling. For example, the first configuration information may be configured by RRC layer signaling. Alternatively, the first configuration information may be configured by MAC layer signaling.

In one embodiment, both the first configuration information and the number of the plurality of PRACH transmissions are used to determine the length of the first time window.

In one embodiment, the first configuration information is used to configure a PRACH resource pool of the plurality of PRACH transmissions.

In one embodiment, the first configuration information includes at least two candidate time lengths (or referred to as a plurality of candidate time lengths), and the number of the plurality of PRACH transmissions is used to determine the length of the first time window from the at least two candidate time lengths.

In one embodiment, the number of the plurality of PRACH transmissions corresponds to one of the plurality of candidate time length groups, any one of the plurality of candidate time length groups includes at least one time length, and the first configuration information is used to determine the length of the first time window from a candidate time length group corresponding to the number of the plurality of PRACH transmissions in the plurality of candidate time length groups.

In one embodiment, both the first configuration information and the number of the plurality of random access occasions included in the first random access occasion group are used to determine the length of the first time window.

In one embodiment, the first configuration information includes at least two candidate time lengths (or referred to as a plurality of candidate time lengths), and the number of the plurality of random access occasions included in the first random access occasion group is used to determine the length of the first time window from the at least two candidate time lengths.

In one embodiment, the number of the plurality of random access occasions included in the first random access occasion group corresponds to one of the plurality of candidate time length groups, any one of the plurality of candidate time length groups includes at least one time length, and the first configuration information is used to determine the length of the first time window from a candidate time length group corresponding to the number of the plurality of random access occasions included in the first random access time group in the plurality of candidate time length groups.

Figure 6:
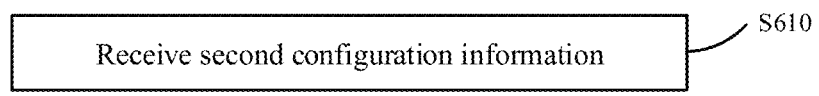
FIG. 6 is still another schematic flowchart of a method applied at a first node for wireless communication according to an embodiment of the present disclosure.

FIG. 6 is still another schematic flowchart of a method applied at a node for wireless communication according to an embodiment of the present disclosure. The method shown in FIG. 6 may be performed by the first node. The method shown in FIG. 6 may include operation S610.

At operation S610, second configuration information is received.

In one embodiment, the second configuration information may be received by a first receiver of the first node.

In one embodiment, the second configuration information may be sent by a second node. Certainly, in the embodiments of the present disclosure, the second configuration information may be sent by other nodes, which is not limited in the embodiments of the present disclosure.

In one embodiment, the first configuration information may be configured by higher layer signaling or high layer signaling. In other words, the first configuration information may be carried in higher layer signaling or high layer signaling. For example, the first configuration information may be configured by RRC layer signaling. Alternatively, the first configuration information may be configured by MAC layer signaling.

In one embodiment, the second configuration information is used to configure a PRACH resource pool of the plurality of PRACH transmissions. In one embodiment, the PRACH resource pool refers to the PRACH occasion or the random access preamble mentioned above.

In one embodiment, the second configuration information includes one candidate time length.

In one embodiment, the second configuration information includes one candidate time length, and a length of the first time window is determined according to the candidate time length and a first coefficient.

In one embodiment, the second configuration information includes one candidate time length, and the length of the first time window is equal to a sum of the candidate time length and the first coefficient.

In one embodiment, the second configuration information includes one candidate time length, and the length of the first time window is equal to a sum of the candidate time length and the first coefficient of time slots.

In one embodiment, the second configuration information includes one candidate time length, and the length of the first time window is equal to a product of the candidate time length and the first coefficient.

For detailed description of the first coefficient, reference may be made to the foregoing, and for brevity, details are not described herein again.

In some scenarios, a plurality of random access occasions may be included in one time instant, and a length of the first time window corresponding to the time instant may be related to a number of random access occasions in the time instant. This is described below with reference to FIG. 7.

It should be noted that the time instant is not specifically limited in the embodiments of the present disclosure. In one embodiment, the time instant includes one PRACH time slot. In one embodiment, the time instant includes one multicarrier symbol. In one embodiment, the time instant includes a plurality of multicarrier symbols.

Figure 7:
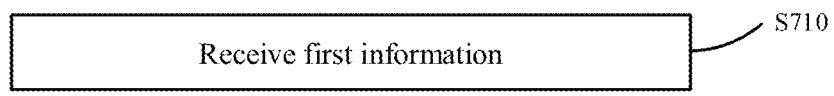
FIG. 7 is yet another schematic flowchart of a method applied at a first node for wireless communication according to an embodiment of the present disclosure.

FIG. 7 is yet another schematic flowchart of a method applied at a node for wireless communication according to an embodiment of the present disclosure. The method shown in FIG. 7 may be performed by a first node. The method shown in FIG. 7 may include operation S710.

At operation S710, first information is received.

In one embodiment, the first information may be received by a first receiver of the first node.

In one embodiment, the first information may be sent by a second node. Certainly, in the embodiments of the present disclosure, the first information may be sent by other nodes, which is not limited in the embodiments of the present disclosure.

In one embodiment, the first information indicates a number of at least one random access occasion within one time instant.

In one embodiment, a plurality of random access occasions within the time instant are frequency multiplexed. Alternatively, a plurality of random access occasions within the time instant are orthogonal in time domain.

In one embodiment, when a number of the at least one random access occasion within the time instant is greater than 1, the plurality of random access occasions within the time instant are frequency multiplexed. Alternatively, when the number of the at least one random access occasion within the time instant is greater than 1, the plurality of random access occasions within the time instant are orthogonal in time domain.

In one embodiment, a length of the first time window is related to the number of the at least one random access occasion within the time instant.

In one embodiment, the number of the at least one random access occasion within the time instant is used to determine the length of the first time window.

In one embodiment, the length of the first time window is linearly related to the number of the at least one random access occasion within the time instant.

In one embodiment, the length of the first time window increases or remains unchanged as the number of the at least one random access occasion within the time instant increases.

In one embodiment, the length of the first time window is proportional to the number of the at least one random access occasion within the time instant.

In the embodiments of the present disclosure, a relationship between the first random access occasion group and the time instant is not limited. In some implementations, all the random access occasions in the first random access occasion group may be within one time instant (that is, the time instant described above). In some other implementations, any two random access occasions in the first random access occasion group are respectively in two different time instants. For example, each random access occasion in the first random access occasion group is in a different time instant. Certainly, in the embodiments of the present disclosure, two of random access occasions in the first random access occasion group are respectively in two different time instants, and correspondingly, other random access occasions in addition to the two random access occasions in the first random access occasion group may be within the same time instant, and the other random access occasions may include one or more random access occasions.

In the embodiments of the present disclosure, the two random access occasions (any two random access occasions, or two of random access occasions) being respectively in two different time instants may be replaced with the two random access occasions (any two random access occasions, or two of random access occasions) respectively occupying two different time instants.

In addition, the two random access occasions (any two random access occasions or two of random access occasions) are not specifically limited in the embodiments of the present disclosure. In one embodiment, the two random access occasions are frequency multiplexed. In one embodiment, the two random access occasions are orthogonal in time domain.

In some scenarios, the first random access occasion group may be one of the plurality of random access occasion groups, and one or more of the plurality of random access occasion groups may include a plurality of random access occasions. The plurality of random access occasion groups in the embodiments of the present disclosure are described below.

In one embodiment, the plurality of random access occasions included in each of at least two random access occasion groups in the plurality of random access occasion groups include one or more different random access occasions. In other words, the plurality of random access occasions included in each of the at least two random access occasion groups in the plurality of random access occasion groups include at least one different random access occasion.

It should be noted that the plurality of random access occasions included in each of the at least two random access occasion groups including at least one different random access occasion may be understood as all of the plurality of random access occasions included in each of the at least two random access occasion groups are different. Certainly, in the embodiments of the present disclosure, it may be further understood as some of the plurality of random access occasions included in each of the at least two random access occasion groups are different.

In addition, the random access occasion group in which different random access occasions are included is not limited in the embodiments of the present disclosure. In one embodiment, the plurality of random access occasions included in each of any two random access occasion groups in the plurality of random access occasion groups includes at least one different random access occasion. In one embodiment, the plurality of random access occasions included in each of two of the plurality of random access occasion groups includes at least one different random access occasion.

Certainly, in the embodiments of the present disclosure, the plurality of random access occasions included in each of all the random access occasion groups in the plurality of random access occasion groups may be completely the same.

In one embodiment, a number of the plurality of random access occasions included in any one of the plurality of random access occasion groups is one of 2, 4, and 8, or the number of the plurality of random access occasions in one of the plurality of random access occasion groups is one of 2, 4, and 8. Certainly, in the embodiments of the present disclosure, the one or more random access occasion groups in the plurality of random access occasion groups may include another number of random access occasions.

In one embodiment, the first random access occasion group includes two random access occasions.

In one embodiment, the first random access occasion group includes four random access occasions.

In one embodiment, the first random access occasion group includes eight random access occasions.

In one embodiment, the plurality of random access occasion groups respectively correspond to a plurality of preambles, and preambles corresponding to at least two random access occasion groups in the plurality of random access occasion groups are different.

It should be noted that the preambles corresponding to the at least two random access occasion groups being different may be understood as the preambles corresponding to each random access occasion group in a plurality of random access occasion groups are different. Certainly, in the embodiments of the present disclosure, it may be further understood as preambles corresponding to some of a plurality of random access occasion groups included in the at least two random access occasion groups are different.

In one embodiment, a plurality of first-type sequences are respectively used to generate the plurality of preambles corresponding to the plurality of random access occasion groups.

The plurality of first-type sequences are not limited in the embodiments of the present disclosure. In one embodiment, any two of the plurality of first-type sequences are different. In one embodiment, initial values of any two of the plurality of first-type sequences are different. In one embodiment, cyclic shifts of any two of the plurality of first-type sequences are different. Certainly, in the embodiments of the present disclosure, the initial values of any two of the plurality of first-type sequences as well as the cyclic shifts of any two of the plurality of first-type sequences are different. Alternatively, the initial values of any two of the plurality of first-type sequences are the same, but the cyclic shifts of the two first-type sequences are different. Alternatively, the initial values of any two of the plurality of first-type sequences are different, but the cyclic shifts of the two first-type sequences are the same.

In one embodiment, two of the plurality of first-type sequences are different. In one embodiment, initial values of two of the plurality of first-type sequences are different. In one embodiment, cyclic shifts of two of the plurality of first-type sequences are different. Certainly, in the embodiments of the present disclosure, the initial values of two of the plurality of first-type sequences as well as the cyclic shifts of two of the plurality of first-type sequences are different. Alternatively, the initial values of two of the plurality of first-type sequences are the same, but the cyclic shifts of the two first-type sequences are different. Alternatively, the initial values of two of the plurality of first-type sequences are different but the cyclic shifts of the two first-type sequences are the same.

The foregoing describes a plurality of random access occasion groups in the embodiments of the present disclosure, and the following describes a manner of determining the plurality of random access occasions included in the first random access occasion group in the embodiments of the present disclosure.

In one embodiment, a number of the plurality of random access occasions included in the first random access occasion group may be determined based on a reception quality of a first synchronization signal block. In other words, the method in the embodiments of the present disclosure may further include receiving a first synchronization signal block. The reception quality of the first synchronization signal block is used to determine the number of the plurality of random access occasions included in the first random access occasion group.

In the embodiments of the present disclosure, the reception quality of the first synchronization signal block is not limited. In one embodiment, the reception quality of the first synchronization signal block includes a reference signal receiving power (RSRP). In one embodiment, the reception quality of the first synchronization signal block includes an SS-RSRP (or referred to as SSB-RSRP). In one embodiment, the reception quality of the first synchronization signal block includes a CSI-RSRP.

In one embodiment, a definition of the SS-RSRP refers to section 5.1.1 of 3 GPP TS 38.215.

In one embodiment, a definition of the CSI-RSRP refers to section 5.1.2 of 3 GPP TS 38.215.

In one embodiment, the reception quality of the first synchronization signal block includes a reference signal receiving quality (RSRQ). In one embodiment, the reception quality of the first synchronization signal block includes an SS-RSRQ.

In one embodiment, a definition of the SS-RSRP refers to section 5.1.3 of 3 GPP TS 38.215.

In one embodiment, the reception quality of the first synchronization signal block includes a signal to interference plus noise ratio (SINR). In one embodiment, the reception quality of the first synchronization signal block includes an SS-SINR.

In one embodiment, a definition of the SS-RSRP refers to section 5.1.5 of 3 GPP TS 38.215.

In the embodiments of the present disclosure, the first synchronization signal block may be sent by the network device. In an example, the second node is a network device, and the first synchronization signal block may be sent by the second node. In addition, in the embodiments of the present disclosure, the first synchronization signal block may also be referred to as a synchronization signal/physical broadcast channel block (SS/PBCH block).

In one embodiment, a plurality of beams are respectively used to transmit, in the first random access occasion group, a plurality of preambles corresponding to the first random access occasion group, and the plurality of beams are the same. Certainly, in the embodiments of the present disclosure, the plurality of beams may also be partially or completely the same.

In one embodiment, the plurality of random access preambles are respectively transmitted on the plurality of PRACHs by using a same beam.

In one embodiment, the plurality of random access preambles are respectively transmitted on the plurality of PRACHs by using a same spatial domain filter.

In one embodiment, the plurality of random access preambles are respectively transmitted on the plurality of PRACHs by using a same spatial domain transmission filter.

In some scenarios, after the first node monitors the first control signaling, the first node may schedule the PDSCH according to the first control signaling. This is described below.

In one embodiment, the method in the embodiments of the present disclosure may further include receiving a first transport block during a first time window. The first transport block is in a corresponding PDSCH, and the first control signaling is used to schedule the PDSCH.

In one embodiment, the first transport block is received by a first receiver of the first node.

In one embodiment, the first transport block is transmitted by a second node, and the second node may be, for example, a network device. However, the embodiments of the present disclosure are not limited thereto. In one embodiment, the first transport block is transmitted by another node other than the second node.

In one embodiment, the first transport block is used for a random access response.

In one embodiment, the random access response includes the first transport block.

In one embodiment, both the first control signaling and the first transport block are used for the random access response.

In one embodiment, the random access response includes the first control signaling and the first transport block.

It should be noted that the beam mentioned in the present disclosure may include or be replaced with at least one of a beam, a physical beam, a logical beam, a spatial filter, a spatial domain filter, a spatial domain transmission filter, a spatial domain reception filter, and an antenna port.

It should be noted that the multicarrier symbol mentioned in the present disclosure may include or be replaced with at least one of a symbol, a multicarrier symbol, an orthogonal frequency division multiplexing (OFDM) symbol, a discrete Fourier transformation-spread-OFDM (DFT-s-OFDM) symbol, and a single-carrier frequency division multiple access (SC-FDMA) symbol.

It should be noted that the random access occasion mentioned in the present disclosure may include or be replaced with at least one of a random access occasion, a physical random access channel occasion, and a PRACH occasion.

Figure 8:
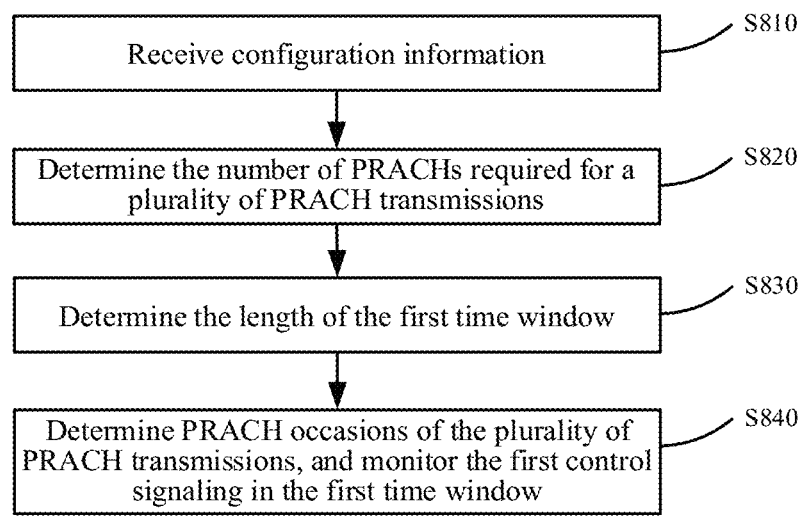
FIG. 8 is still yet another schematic flowchart of a method applied at a first node for wireless communication according to an embodiment of the present disclosure.

For ease of understanding, an example in which the first node determines the length of the first time window based on the configuration information is given below with reference to FIG. 8. The method shown in FIG. 8 may include operation S810 to operation S840.

At operation S810, configuration information is received.

In one embodiment, the configuration information is used to configure PRACH occasions of a plurality of PRACH transmissions. Alternatively, the configuration information is used to configure a PRACH resource pool of the plurality of PRACH transmissions.

In one embodiment, the configuration information may be the first configuration information mentioned above.

In one embodiment, the configuration information may be the second configuration information mentioned above.

In one embodiment, the configuration information includes at least one candidate time length.

At operation S820, a number of PRACHs required for the plurality of PRACH transmissions is determined.

In one embodiment, a signal quality received by the first node is used to determine the number of PRACHs required for the plurality of PRACH transmissions.

In one embodiment, the signal quality received by the first node may be the signal quality for the first synchronization signal block mentioned above.

In one embodiment, the signal quality received by the first node is indicated by an SSB-RSRP.

In one embodiment, the number of PRACHs required for the plurality of PRACH transmissions may be, for example, one of 2, 4, and 8.

It should be noted that the execution order of operation S810 and operation S820 is not specifically limited in the embodiments of the present disclosure. In some embodiments, operation S810 is prior to operation S820. In some embodiments, operation S810 is subsequent to operation S820. In some embodiments, operation S810 and operation S820 may be performed simultaneously.

At operation S830, a length of the first time window is determined.

In one embodiment, the number of PRACHs required for the plurality of PRACH transmissions is used to determine the length of the first time window.

In one embodiment, the configuration information includes at least two candidate time lengths, and the first node selects one of the at least two candidate time lengths according to the number of PRACHs required for the plurality of PRACH transmissions as the length of the first time window.

In one embodiment, the configuration information includes one candidate time length, and the first node determines the length of the first time window according to the candidate time length and a first coefficient. Detailed descriptions of the first coefficient can be referred to the foregoing descriptions, and details are not described herein again.

At operation S840, PRACH occasions of a plurality of PRACH transmissions are determined, and the first control signaling is monitored during the first time window.

In one embodiment, the first node randomly selects PRACH occasions of the plurality of PRACH transmissions in configured PRACH occasions. Alternatively, the first node randomly selects resources of the plurality of PRACH transmissions in a configured PRACH resource pool.

In one embodiment, the first node monitors a Msg2 during the first time window.

In one embodiment, the Msg2 includes the first control signaling.

In this way, in the embodiments of the present disclosure, for a plurality of PRACH transmissions with a relatively large number of PRACHs, the first node is able to select a longer length of the first time window, which is conducive to ensuring effective detection of the plurality of PRACHs, and for a plurality of PRACH transmissions with a relatively small number of PRACHs, the first node is able to select a shorter length of the first time window, which is conducive to reducing the random access delay.

For ease of understanding, several examples of the correspondence between the candidate time length and the candidate numbers are given below in conjunction with FIG. 9 to FIG. 11. It should be noted that in the following examples, the plurality of PRACH transmissions are described by taking a plurality of PRACH occasions included in the ROG as an example. It should also be noted that in the following examples, the first time window is described by taking a RAR window as an example.

Example 1

Figure 9:
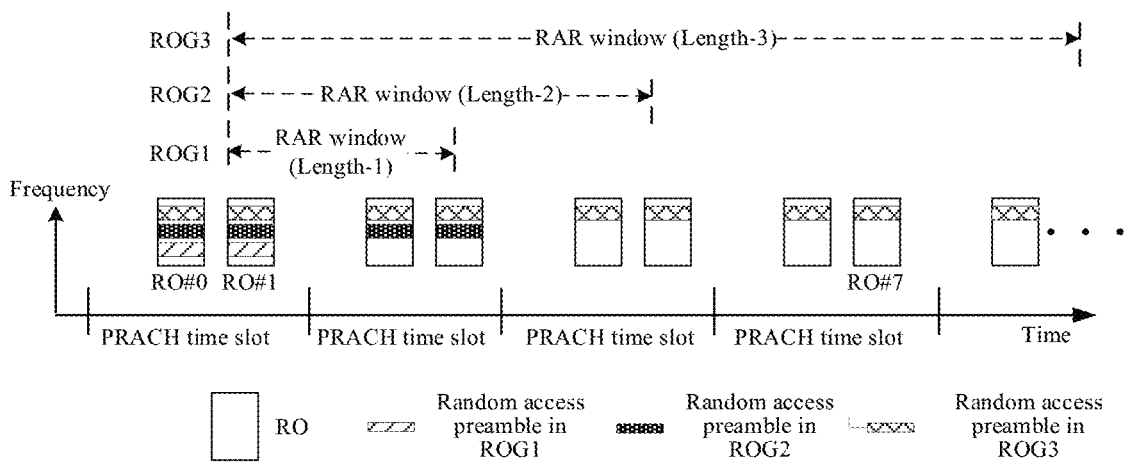
FIG. 9 is an example diagram of configuration of a first time window according to an embodiment of the present disclosure.

Referring to FIG. 9, in Example 1, the numbers of PRACH occasions in different ROGs are different, where the number of PRACH occasions in ROG1 is 2, and the two PRACH occasions included in ROG1 are used for one random access attempt of two PRACH transmissions. The number of PRACH occasions in ROG2 is 4, and the four PRACH occasions included in ROG2 are used for one random access attempt of four PRACH transmissions. The number of PRACH occasions in ROG3 is 8, and the eight PRACH occasions included in ROG3 are used for one random access attempt of eight PRACH transmissions.

In Example 1, the system (e.g., a network side) configures three candidate time lengths (Length-1<Length-2<Length-3) for the plurality of PRACH transmissions.

When the number of PRACHs in the plurality of PRACH transmissions is 2, the length of the RAR window used is Length-1; when the number of PRACHs in the plurality of PRACH transmissions is 4, the length of the RAR window used is Length-2; and when the number of PRACHs in the plurality of PRACH transmissions is 8, the length of the RAR window used is Length-3.

Alternatively, in this example, the length of the RAR window configured for one random access attempt of two PRACH transmissions is Length-1, the length of the RAR window configured for one random access attempt of four PRACH transmissions is Length-2, and the length of the RAR window configured for one random access attempt of 8 PRACH sends is Length-3, where Length-1<Length-2<Length-3.

Example 2

Figure 10:
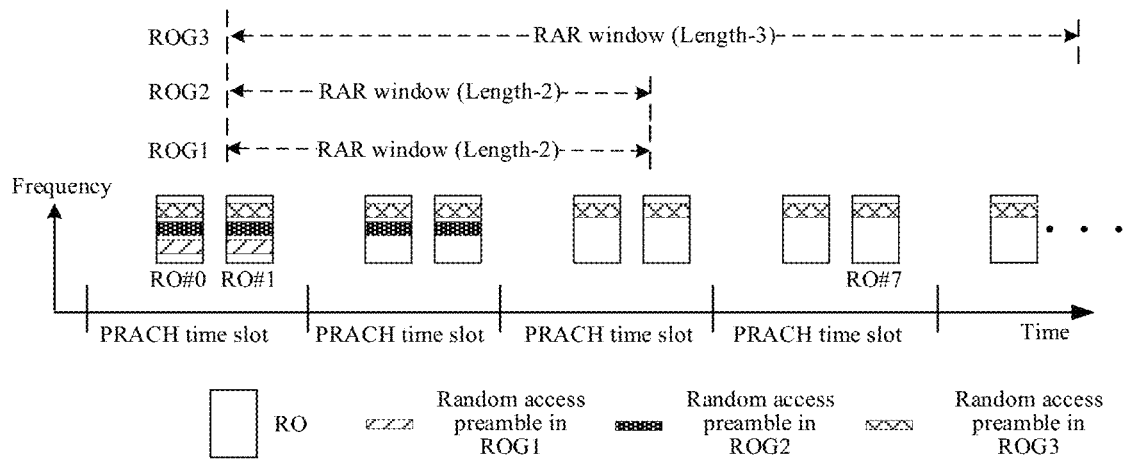
FIG. 10 is another example diagram of configuration of a first time window according to an embodiment of the present disclosure.

Referring to FIG. 10, in Example 2, the numbers of PRACH occasions in different ROGs are different, where the number of PRACH occasions in ROG1 is 2, and the two PRACH occasions included in ROG1 are used for one random access attempt of two PRACH transmissions. The number of PRACH occasions in ROG2 is 4, and the four PRACH occasions included in ROG2 are used for one random access attempt of four PRACH transmissions. The number of PRACH occasions in ROG3 is 8, and the eight PRACH occasions included in ROG3 are used for one random access attempt of eight PRACH transmissions.

In Example 2, the system (e.g., the network side) configures two candidate time lengths (Length-2<Length-3) for the plurality of PRACH transmissions.

In one embodiment, when the number of PRACHs in the plurality of PRACH transmissions is 2 or 4, the length of the RAR window used is Length-2; and when the number of PRACHs in the plurality of PRACH transmissions is 8, the length of the RAR window used is Length-3.

Alternatively, in this example, the length of the RAR window configured for one random access attempt of two PRACH transmissions or one random access attempt of four PRACH transmissions is Length-2, and the length of the RAR window configured for one random access attempt of eight PRACH sends is Length-3, where Length-2<Length-3.

Certainly, in some embodiments, when the number of PRACHs in the plurality of PRACH transmissions is 2, the length of the RAR window used is Length-2; and when the number of PRACHs in the plurality of PRACH transmissions is 4 or 8, the length of the RAR window used is Length-3.

Example 3

Figure 11:
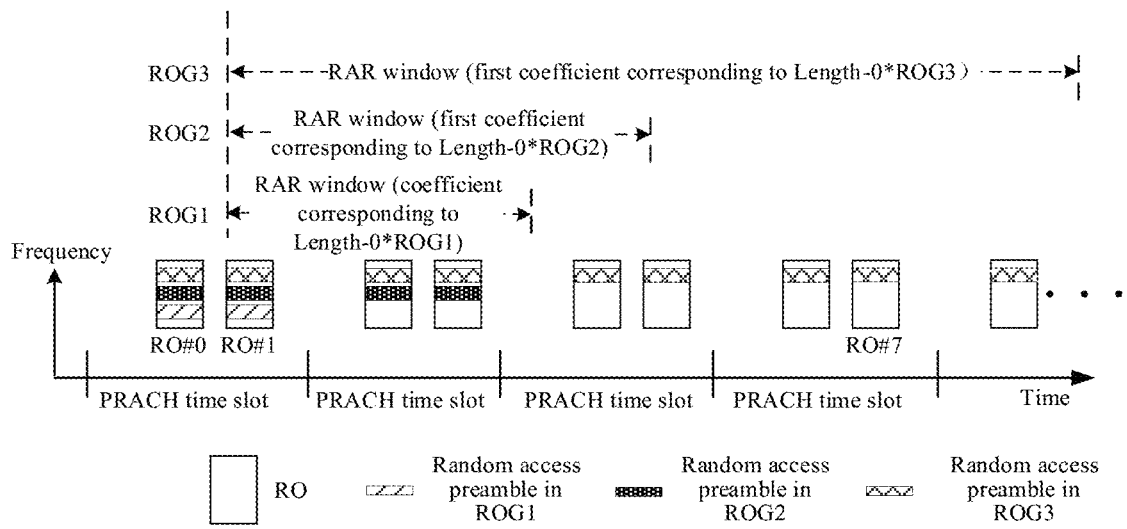
FIG. 11 is still another example diagram of configuration of a first time window according to an embodiment of the present disclosure.

Referring to FIG. 11, in Example 3, the numbers of PRACH occasions in different ROGs are different, where the number of PRACH occasions in ROG1 is 2, and the two PRACH occasions included in ROG1 are used for one random access attempt of two PRACH transmissions. The number of PRACH occasions in ROG2 is 4, and the four PRACH occasions included in ROG2 are used for one random access attempt of four PRACH transmissions. The number of PRACH occasions in ROG3 is 8, and the eight PRACH occasions included in ROG3 are used for one random access attempt of eight PRACH transmissions.

In Example 3, the system (e.g., the network side) configures one candidate time length (Length-0) for the plurality of PRACH transmissions.

In this example, the length of the first time window may be determined based on this configured candidate time length (Length-0) and the number of PRACHs of the plurality of PRACH transmissions. For example, the length of the RAR window configured for the plurality of PRACH transmissions with different PRACH numbers is a product of the first coefficient and Length-0. The first coefficient is determined based on the number of PRACHs of the plurality of PRACH transmissions, for example, the first coefficient is equal to the number of PRACHs of the plurality of PRACH transmissions.

The method applied at the first node for wireless communication provided in the embodiments of the present disclosure is described in detail above from a perspective of the first node in conjunction with FIG. 4 to FIG. 11. The following describes a method applied at a second node for wireless communication provided in the embodiments of the present disclosure from a perspective of the second node in conjunction with FIG. 12. It should be understood that the descriptions of the first node and the second node correspond to each other, and therefore, portions not described in detail may be referred to in the preceding section.

In one embodiment, the second node may be a node in a communication system that receives a random access preamble.

In one embodiment, the second node may be a base station.

In one embodiment, the second node includes a first transmitter and a first receiver.

Figure 12:
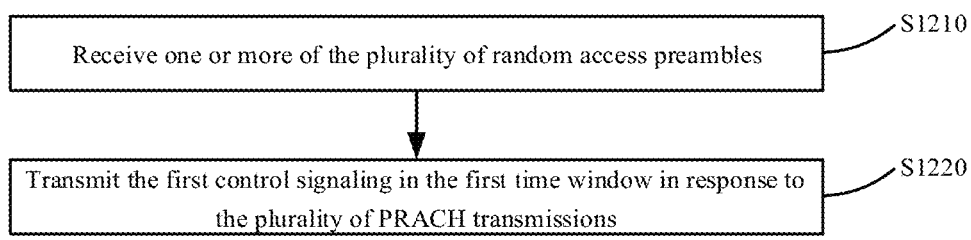
FIG. 12 is a schematic flowchart of a method applied at a second node for wireless communication according to an embodiment of the present disclosure.

FIG. 12 is a flow diagram of a method applied at a second node for wireless communication provided in the embodiments of the present disclosure. The method shown in FIG. 12 may include operation S1210 and operation S1220.

At operation S1210, one or more of a plurality of random access preambles are received.

In one embodiment, the plurality of random access preambles are received by a first receiver of the second node.

In one embodiment, the plurality of random access preambles are transmitted by the first node. The first node may be, for example, a user equipment, a relay, etc.

In one embodiment, a plurality of physical random access channel occasions are used for transmission of the plurality of random access preambles, and the plurality of physical random access channel occasions respectively correspond to a plurality of physical random access channel transmissions.

At operation S1220, in response to the plurality of physical random access channel transmissions, a first control signaling is transmitted during a first time window.

In one embodiment, the length of the first time window is related to the number of the plurality of physical random access channel transmissions.

In one embodiment, the first control signaling is scrambled by a first RNTI, and the first RNTI is associated with the plurality of physical random access channel occasions.

In one embodiment, the length of the first time window is linearly related to the number of the plurality of physical random access channel transmissions.

In one embodiment, the length of the first time window is one of a plurality of candidate time lengths, and the number of the plurality of physical random access channel sends is one of a plurality of candidate numbers. The plurality of candidate time lengths are in one-to-one correspondence with the plurality of candidate numbers, or one of the plurality of candidate time lengths corresponds to one or more of the plurality of candidate numbers. The number of the plurality of physical random access channel transmissions is used to determine the length of the first time window from the plurality of candidate time lengths.

In one embodiment, the length of the first time window belongs to one of a plurality of candidate time length groups, and any one of the plurality of candidate time length groups includes at least one time length. The number of the plurality of physical random access channel transmissions is one of the plurality of candidate numbers, and the plurality of candidate time length groups are in one-to-one correspondence with the plurality of candidate numbers, or one of the plurality of candidate time length groups corresponds to one or more of the plurality of candidate numbers. The number of the plurality of physical random access channel transmissions is used to determine, from the plurality of candidate time length groups, a candidate time length group to which the length of the first time window belongs.

In one embodiment, the first transmitter transmits first configuration information. Both the first configuration information and the number of the plurality of physical random access channel transmissions are used to determine the length of the first time window.

In one embodiment, the first configuration information includes at least two candidate time lengths, and the number of the plurality of physical random access channel transmissions is used to determine the length of the first time window from the at least two candidate time lengths.

In one embodiment, the number of the plurality of physical random access channel transmissions corresponds to one of the plurality of candidate time length groups, and any one of the plurality of candidate time length groups includes at least one time length. The first configuration information is used to determine the length of the first time window from a candidate time length group corresponding to the number of the plurality of physical random access channel transmissions in the plurality of candidate time lengths.

In one embodiment, the first transmitter transmits second configuration information, and the second configuration information includes one candidate time length. The length of the first time window is determined based on the candidate time length and a first coefficient, and the first coefficient is related to the number of the plurality of physical random access channel transmissions.

In one embodiment, the first coefficient is equal to the number of the plurality of physical random access channel transmissions.

In one embodiment, the first time window starts after a last multicarrier symbol of a last physical random access channel occasion among the plurality of physical random access channel occasions.

In one embodiment, the first time window starts after a last multicarrier symbol of a first physical random access channel occasion among the plurality of physical random access channel occasions.

In one embodiment, the first transmitter transmits a first message, and the first message is used to indicate a number of at least one physical random access channel occasion within one time instant. The plurality of physical random access channel occasions within the time instant are frequency multiplexed in response to the number of the at least one physical random access channel occasion within the time instant being greater than 1. The length of the first time window is related to the number of the at least one physical random access channel occasion within the time instant.

In one embodiment, any two of the plurality of physical random access channel occasions are respectively in two different time instants.

In one embodiment, the plurality of physical random access channel occasions belong to one of a plurality of random access occasion groups, and any one of the plurality of random access occasion groups includes a plurality of physical random access channel occasions. The plurality of physical random access channel occasions included in each of at least two of the plurality of random access occasion groups include at least one different physical random access channel occasion.

In one embodiment, the plurality of physical random access channel occasions belong to one of the plurality of random access occasion groups, and any one of the plurality of random access occasion groups includes a plurality of physical random access channel occasions. The plurality of random access occasion groups respectively correspond to a plurality of preambles, and preambles corresponding to at least two of the plurality of random access occasion groups are different.

In one embodiment, the first transmitter transmits a first synchronization signal block, and a reception quality of the first synchronization signal block is used to determine the number of the plurality of physical random access channel transmissions.

In one embodiment, the number of the plurality of physical random access channel transmissions is one of 2, 4, or 8.

In one embodiment, a plurality of beams are used to transmit the plurality of random access preambles, respectively, and the plurality of beams are the same.

In one embodiment, the first transmitter transmits a first transport block during the first time window, the first transport block is in a corresponding PDSCH, and the first control signaling is used to schedule the PDSCH.

Method embodiments of the present disclosure are described in detail above in conjunction with FIG. 1 to FIG. 12, and device embodiments of the present disclosure are described in detail below in conjunction with FIG. 13 to FIG. 16. It should be understood that the description of the method embodiments corresponds to the description of the device embodiments, so that portions not described in detail can be referred to the preceding method embodiments.

Figure 13:
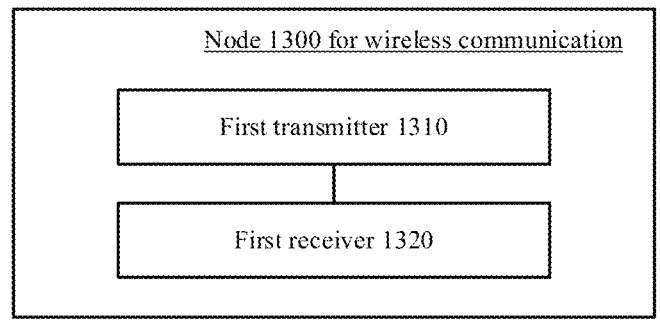
FIG. 13 is a schematic structural diagram of a node for wireless communication according to an embodiment of the present disclosure.

FIG. 13 is a schematic structural diagram of a node for wireless communication provided in an embodiment of the present disclosure. The node 1300 shown in FIG. 13 may be the first node as described in any of the preceding paragraphs. The node 1300 may include a first transmitter 1310 and a first receiver 1320.

The first transmitter 1310 may be used to transmit a plurality of random access preambles, a plurality of physical random access channel occasions are used for the transmission of the plurality of random access preambles, and the plurality of physical random access channel occasions respectively corresponding to a plurality of physical random access channel transmissions.

The first receiver 1320 may monitor the first control signaling during the first time window in response to the plurality of physical random access channel transmissions. The length of the first time window is related to the number of the plurality of physical random access channel transmissions.

In one embodiment, the first control signaling is scrambled by a first RNTI, and the first RNTI is associated with the plurality of physical random access channel occasions.

In one embodiment, the length of the first time window is linearly related to the number of the plurality of physical random access channel transmissions.

In one embodiment, the length of the first time window is one of a plurality of candidate time lengths, and the number of the plurality of physical random access channel transmissions is one of a plurality of candidate numbers. The plurality of candidate time lengths are in one-to-one correspondence with the plurality of candidate numbers, or one of the plurality of candidate time lengths corresponds to one or more of the plurality of candidate numbers. The number of the plurality of physical random access channel transmissions is used to determine the length of the first time window from the plurality of candidate time lengths.

In one embodiment, the length of the first time window belongs to one of a plurality of candidate time length groups, and any one of the plurality of candidate time length groups includes at least one time length. The number of the plurality of physical random access channel transmissions is one of the plurality of candidate numbers. The plurality of candidate time length groups are in one-to-one correspondence with the plurality of candidate numbers, or one of the plurality of candidate time length groups corresponds to one or more of the plurality of candidate numbers. The number of the plurality of physical random access channel transmissions is used to determine, from the plurality of candidate time length groups, a candidate time length group to which the length of the first time window belongs.

In one embodiment, the first receiver receives first configuration information, and both the first configuration information and the number of the plurality of physical random access channel transmissions are used to determine the length of the first time window.

In one embodiment, the first configuration information includes at least two candidate time lengths, and the number of the plurality of physical random access channel transmissions is used to determine the length of the first time window from the at least two candidate time lengths.

In one embodiment, the number of the plurality of physical random access channel transmissions corresponds to one of the plurality of candidate time length groups, and any one of the plurality of candidate time length groups includes at least one time length. The first configuration information is used to determine the length of the first time window from a candidate time length group corresponding to the number of the plurality of physical random access channel transmissions in the plurality of candidate time length groups.

In one embodiment, the first receiver receives second configuration information, and the second configuration information includes one candidate time length. The length of the first time window is determined according to the candidate time length and a first coefficient, and the first coefficient is related to the number of the plurality of physical random access channel transmissions.

In one embodiment, the first coefficient is equal to the number of the plurality of physical random access channel transmissions.

In one embodiment, the first time window starts after a last multicarrier symbol of a last physical random access channel occasion among the plurality of physical random access channel occasions.

In one embodiment, the first time window starts after a last multicarrier symbol of a first physical random access channel occasion among the plurality of physical random access channel occasions.

In one embodiment, the first receiver receives first information, and the first information indicates a number of at least one physical random access channel occasion within one time instant. The plurality of physical random access channel occasions within the time instant are frequency multiplexed in response to the number of the at least one physical random access channel occasion within the time instant being greater than 1, and the length of the first time window is related to the number of the at least one physical random access channel occasion within the time instant.

In one embodiment, any two of the plurality of physical random access channel occasions are respectively in two different time instants.

In one embodiment, the plurality of physical random access channel occasions belong to one of the plurality of random access occasion groups, any one of the plurality of random access occasion groups includes a plurality of physical random access channel occasions, and the plurality of physical random access channel occasions included in each of at least two random access occasion groups in the plurality of random access occasion groups include at least one different physical random access channel occasion.

In one embodiment, the plurality of physical random access channel occasions belong to one of the plurality of random access occasion groups, and any one of the plurality of random access occasion groups includes a plurality of physical random access channel occasions. The plurality of random access occasion groups respectively correspond to a plurality of preambles, and preambles corresponding to at least two random access occasion groups in the plurality of random access occasion groups are different.

In one embodiment, the first receiver receives a first synchronization signal block, and a reception quality of the first synchronization signal block is used to determine a number of the plurality of physical random access channel transmissions.

In one embodiment, the number of the plurality of physical random access channel transmissions is one of 2, 4, or 8.

In one embodiment, a plurality of beams are respectively used to transmit the plurality of random access preambles, and the plurality of beams are the same.

In one embodiment, the first receiver receives a first transport block during the first time window, the first transport block is in a corresponding PDSCH, and the first control signaling is used to schedule the PDSCH.

Figure 15:
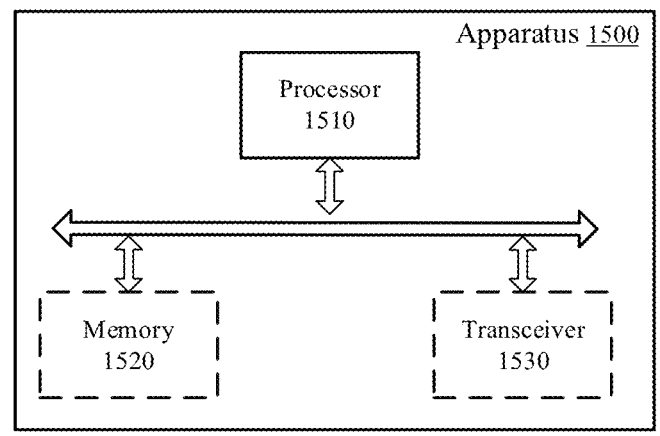
FIG. 15 is a schematic structural diagram of an apparatus according to an embodiment of the present disclosure.

In one embodiment, the first transmitter 1310 and the first receiver 1320 may be a transceiver 1530. The node 1300 may further include a processor 1510 and a memory 1520, as shown in FIG. 15.

Figure 14:
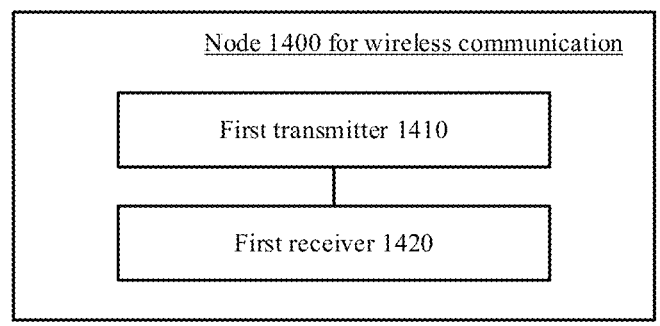
FIG. 14 is another schematic structural diagram of a node for wireless communication according to an embodiment of the present disclosure.

FIG. 14 is another schematic structural diagram of a node for wireless communication according to an embodiment of the present disclosure. A node 1400 shown in FIG. 14 may be any one of the second nodes described above. The node 1400 may include a first receiver 1410 and a first transmitter 1420.

The first receiver 1410 may receive one or more of a plurality of random access preambles, the plurality of physical random access channel occasions are used for transmission of the plurality of random access preambles, and the plurality of physical random access channel occasions respectively correspond to a plurality of physical random access channel transmissions.

The first transmitter 1420 may transmit a first control signaling during a first time window in response to the plurality of physical random access channel transmissions, and the length of the first time window is related to a number of the plurality of physical random access channel transmissions.

In one embodiment, the first control signaling is scrambled by a first RNTI, and the first RNTI is associated with the plurality of physical random access channel occasions.

In one embodiment, the length of the first time window is linearly related to the number of the plurality of physical random access channel transmissions.

In one embodiment, the length of the first time window is one of a plurality of candidate time lengths, and the number of the plurality of physical random access channel transmissions is one of a plurality of candidate numbers. The plurality of candidate time lengths are in one-to-one correspondence with the plurality of candidate numbers, or one of the plurality of candidate time lengths corresponds to one or more of the plurality of candidate numbers. The number of the plurality of physical random access channel transmissions is used to determine the length of the first time window from the plurality of candidate time lengths.

In one embodiment, the length of the first time window belongs to one of the plurality of candidate time length groups, and any one of the plurality of candidate time length groups includes at least one time length. The number of the plurality of physical random access channel transmissions is one of the plurality of candidate numbers. The plurality of candidate time length groups are in one-to-one correspondence with the plurality of candidate numbers, or one of the plurality of candidate time length groups corresponds to one or more of the plurality of candidate numbers. The number of the plurality of physical random access channel transmissions is used to determine, from the plurality of candidate time length groups, a candidate time length group to which the length of the first time window belongs.

In one embodiment, the first transmitter transmits first configuration information, and both the first configuration information and the number of the plurality of physical random access channel transmissions are used to determine the length of the first time window.

In one embodiment, the first configuration information includes at least two candidate time lengths, and the number of the plurality of physical random access channel transmissions is used to determine the length of the first time window from the at least two candidate time lengths.

In one embodiment, the number of the plurality of physical random access channel transmissions corresponds to one of the plurality of candidate time length groups, and any one of the plurality of candidate time length groups includes at least one time length. The first configuration information is used to determine the length of the first time window from a candidate time length group corresponding to the number of the plurality of physical random access channel transmissions in the plurality of candidate time length groups.

In one embodiment, the first transmitter transmits second configuration information, and the second configuration information includes one candidate time length. The length of the first time window is determined according to the candidate time length and a first coefficient, and the first coefficient is related to the number of the plurality of physical random access channel transmissions.

In one embodiment, the first coefficient is equal to the number of the plurality of physical random access channel transmissions.

In one embodiment, the first time window starts after a last multicarrier symbol of a last physical random access channel occasion among the plurality of physical random access channel occasions.

In one embodiment, the first time window starts after a last multicarrier symbol of a first physical random access channel occasion among the plurality of physical random access channel occasions.

In one embodiment, the first transmitter transmits first information, and the first information indicates a number of at least one physical random access channel occasion within one time instant. The plurality of physical random access channel occasions within the time instant are frequency multiplexed in response to the number of the at least one physical random access channel occasion within the time instant being greater than 1, and the length of the first time window is related to the number of at least one physical random access channel occasion within the time instant.

In one embodiment, any two of the plurality of physical random access channel occasions are respectively in two different time instants.

In one embodiment, the plurality of physical random access channel occasions belong to one of the plurality of random access occasion groups, any one of the plurality of random access occasion groups includes a plurality of physical random access channel occasions, and the plurality of physical random access channel occasions included in each of at least two random access occasion groups in the plurality of random access occasion groups include at least one different physical random access channel occasion.

In one embodiment, the plurality of physical random access channel occasions belong to one of the plurality of random access occasion groups, and any one of the plurality of random access occasion groups includes a plurality of physical random access channel occasions. The plurality of random access occasion groups respectively correspond to a plurality of preambles, and preambles corresponding to at least two random access occasion groups in the plurality of random access occasion groups are different.

In one embodiment, the first transmitter transmits a first synchronization signal block, and a reception quality of the first synchronization signal block is used to determine a number of the plurality of physical random access channel transmissions.

In one embodiment, the number of the plurality of physical random access channel transmissions is one of 2, 4, or 8.

In one embodiment, a plurality of beams are respectively used to transmit the plurality of random access preambles, and the plurality of beams are the same.

In one embodiment, the first transmitter transmits a first transport block during the first time window, the first transport block is in a corresponding PDSCH, and the first control signaling is used to schedule the PDSCH.

In one embodiment, the first receiver 1410 and the first transmitter 1420 may be a transceiver 1530. The node 1400 may further include a processor 1510 and a memory 1520, as shown in FIG. 15.

FIG. 15 is a schematic structural diagram of a communication apparatus according to an embodiment of the present disclosure. The dashed line in FIG. 15 indicates that the unit or module is optional. The apparatus 1500 may be configured to implement the method described in the foregoing method embodiments. The apparatus 1500 may be a chip, a user equipment, or a network device.

The apparatus 1500 may include one or more processors 1510, and the processor 1510 may support the apparatus 1500 to implement the method described in the foregoing method embodiments. The processor 1510 may be a general-purpose processor or a dedicated processor. For example, the processor may be a central processing unit (CPU). Alternatively, the processor may be other general-purpose processors, a digital signal processor (DSP), an application specific integrated circuit (ASIC), a field programmable gate array (FPGA) or other programmable logic devices, a discrete gate or transistor logic device, a discrete hardware component, or the like. The general-purpose processor may be a microprocessor, or the processor may be any conventional processor or the like.

The apparatus 1500 may further include one or more memories 1520 storing a program, and the program may be executed by the processor 1510 to cause the processor 1510 to perform the method described in the foregoing method embodiments. The memory 1520 may be independent of the processor 1510 or may be integrated into the processor 1510.

The apparatus 1500 may further include a transceiver 1530 that may communicate with another device or chip through the transceiver 1530. For example, the processor 1510 may transmit and receive data to another device or chip through the transceiver 1530.

Figure 16:
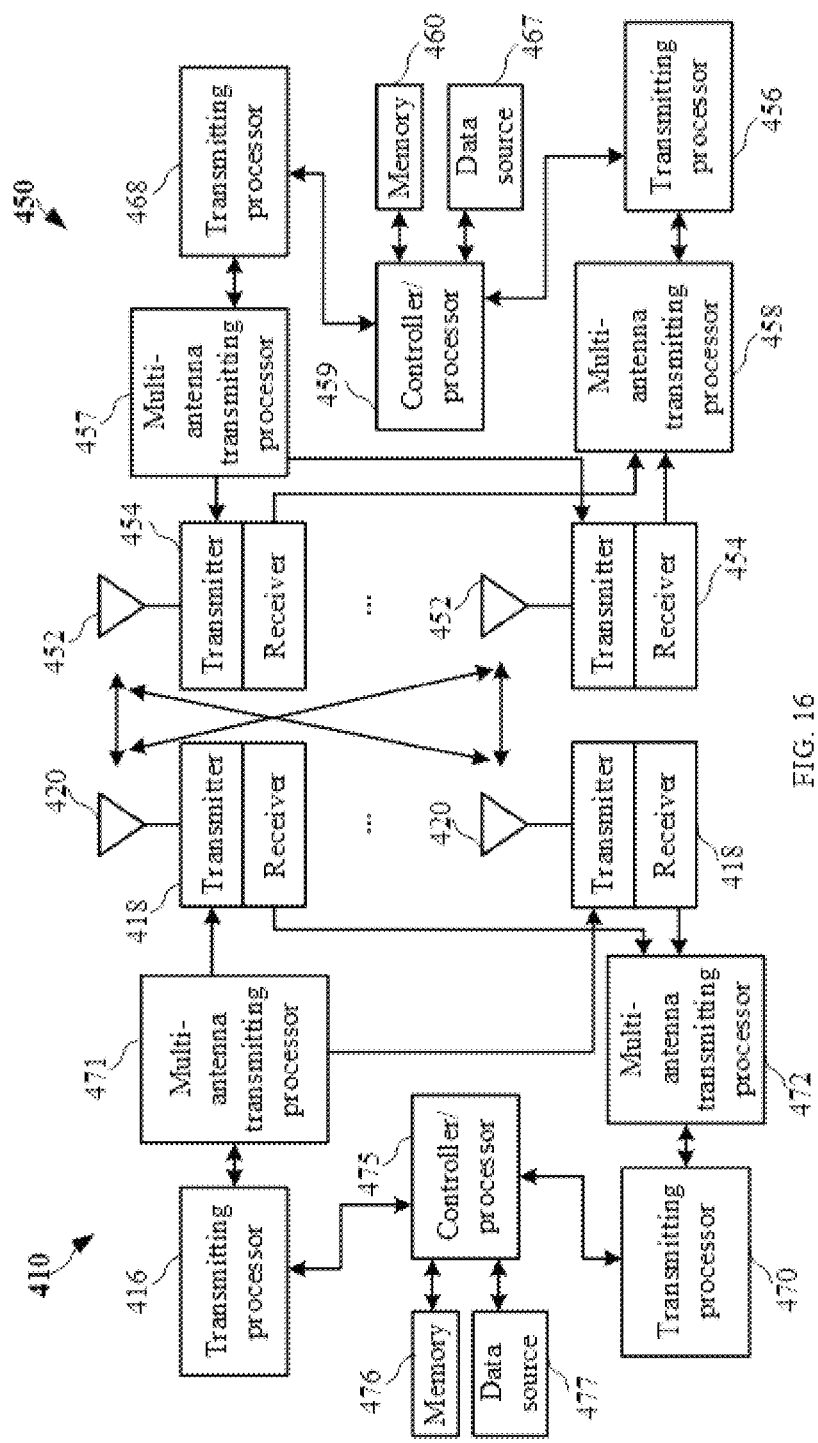
FIG. 16 is a schematic diagram of a hardware module of a communication device according to an embodiment of the present disclosure.

FIG. 16 is a schematic diagram of a hardware module of a communication device according to an embodiment of the present disclosure. Specifically, FIG. 16 shows a block diagram of a first communication device 450 and a second communication device 410 communicating with each other in an access network.

The first communication device 450 includes a controller/processor 459, a memory 460, a data source 467, a transmitting processor 468, a receiving processor 456, a multi-antenna transmitting processor 457, a multi-antenna receiving processor 458, and a transmitter/receiver 454 and an antenna 452.

The second communication device 410 includes a controller/processor 475, a memory 476, a data source 477, a receiving processor 470, a transmitting processor 416, a multi-antenna receiving processor 472, a multi-antenna transmitting processor 471, and a transmitter/receiver 418 and an antenna 420.

In the transmission from the second communication device 410 to the first communication device 450, at the second communication device 410, an upper-layer data packet from a core network or an upper-layer data packet from a data source 477 is provided to a controller/processor 475. The core network and the data source 477 represent all protocol layers above the L2 layer. The controller/processor 475 implements the functionality of the L2 layer. In the transmission from the second communication device 410 to the first communication device 450, the controller/processor 475 provides header compression, encryption, packet segmentation and reordering, multiplexing between logical and transport channels, and radio resource allocation for the first communications device 450 based on various priority metrics. The controller/processor 475 is also responsible for retransmission of the lost packet and signaling to the first communication device 450. The transmitting processor 416 and the multi-antenna transmitting processor 471 perform various signal processing functions for the L1 layer (i.e., physical layer). The transmitting processor 416 implements encoding and interleaving to facilitate forward error correction at the second communication device 410 and mapping of signal clusters based on various modulation schemes (e.g., binary phase shift keying, quadrature phase shift keying, M phase shift keying, M quadrature amplitude modulation). The multi-antenna transmitting processor 471 performs digital spatial precoding on the encoded and modulated symbols, including codebook-based precoding, non-codebook-based precoding, and beamforming processing, to generate one or more spatial streams. The transmitting processor 416 then maps each spatial stream to a subcarrier to be multiplexed with a reference signal (e.g., pilot frequency) in the time domain and/or the frequency domain, and then uses an inverse fast Fourier transform to produce a physical channel carrying a time-domain multicarrier symbol stream. Then, the multi-antenna transmitting processor 471 performs transmitting analog precoding/beamforming operation on the time-domain multicarrier symbol stream. Each transmitter 418 converts a baseband multicarrier symbol stream provided by the multi-antenna transmitting processor 471 into a radio frequency stream, and then provides the radio frequency stream to different antennas 420.

In the transmission from the second communication device 410 to the first communication device 450, at the first communication device 450, each receiver 454 receives a signal through its corresponding antenna 452. Each receiver 454 recovers information modulated onto a radio frequency carrier, and converts a radio frequency stream into a baseband multicarrier symbol stream to be provided to the receiving processor 456. The receiving processor 456 and the multi-antenna receiving processor 458 implement various signal processing functions of the LL layer. The multi-antenna receiving processor 458 performs receiving analog precoding/beamforming operation on the baseband multicarrier symbol stream from the receiver 454. The receiving processor 456 uses a fast Fourier transform to convert the baseband multicarrier symbol stream on which the receiving analog precoding/beamforming operation have been performed from the time domain to the frequency domain. In the frequency domain, the data signal and the reference signal in the physical layer are de-multiplexed by the receiving processor 456, where the reference signal is used for channel estimation, and the data signal recovers any spatial streams destined for the first communication device 450 after multi-antenna detection in the multi-antenna receiving processor 458. The symbols on each spatial stream are demodulated and recovered in the receiving processor 456 to generate a soft decision. The receiving processor 456 then decodes and de-interleaves the soft decision to recover upper layer data and a control signal transmitted by the second communication device 410 on the physical channel. The upper layer data and the control signal are then provided to the controller/processor 459. The controller/processor 459 performs a function of the L2 layer. The controller/processor 459 can be associated with the memory 460 that stores program code and data. The memory 460 may be referred to as a computer-readable medium. In the transmission from the second communication device 410 to the first communication device 450, the controller/processor 459 provides demultiplexing between transport and logical channels, packet reassembling, decrypting, header decompression, and control signal processing to recover the upper-layer data packet from the second communications device 410. The upper layer packet is then provided to all protocol layers above the L2 layer. Various control signals may also be provided to the L3 layer for L3 processing.

In the transmission from the first communication device 450 to the second communication device 410, at the first communication device 450, an upper-layer data packet is provided to the controller/processor 459 using the data source 467. The data source 467 represents all protocol layers above the L2 layer. Similar to the transmission function at the second communication device 410 described in the transmission from the second communication device 410 to the first communication device 450, the controller/processor 459 performs header compression, encryption, packet segmentation, reordering, and multiplexing between logical and transport channels, and implements L2 layer functions for the user plane and the control plane. The controller/processor 459 is also responsible for retransmission of a lost packet and signaling to the second communication device 410. The transmitting processor 468 performs modulation mapping, channel encoding, and the multi-antenna transmitting processor 457 performs digital multi-antenna spatial precoding, including codebook-based precoding, non-codebook-based precoding, and beamforming processing, and then the transmitting processor 468 modulates the generated spatial stream into a multi-carrier/single-carrier symbol stream to be subject to analog precoding/beam-forming operation in the multi-antenna transmitting processor 457 and then to be provided to different antennas 452 via the transmitter 454. Each transmitter 454 first converts the baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via its corresponding antenna 420, converts the received radio frequency signal into a baseband signal, and provides the baseband signal to the multi-antenna receiving processor 472 and the receiving processor 470. The multi-antenna receiving processor 472 and the receiving processor 470 jointly implement the functions of the L1 layer. The controller/processor 475 implements functions of the L2 layer. The controller/processor 475 can be associated with the memory 476 that stores program code and data. The memory 476 may be referred to as a computer-readable medium. In the transmission from the first communication device 450 to the second communication device 410, the controller/processor 475 provides demultiplexing between transport and logical channels, packet reassembling, decrypting, header decompression, and control signal processing to recover the upper-layer data packet from the first communications device 450. The upper-layer data packet from the controller/processor 475 may be provided to all protocol layers above the core network or the L2 layer, and various control signals may also be provided to the core network or the L3 layer for L3 processing.

In one embodiment, the first communication device 450 includes at least one processor and at least one memory, and the at least one memory includes computer program code. The at least one memory and the computer program code are configured for use with the at least one processor, the first communication device 450 at least transmits a plurality of random access preambles, where a plurality of physical random access channel occasions are used for transmission of the plurality of random access preambles, and the plurality of physical random access channel occasions respectively correspond to a plurality of physical random access channel transmissions; and monitors a first control signaling during a first time window in response to the plurality of physical random access channel transmissions, where the length of the first time window is related to the number of the plurality of physical random access channel transmissions.

In one embodiment, the first communication device 450 includes a memory storing a computer-readable instruction program, and the computer-readable instruction program generating operations when executed by at least one processor. The operations includes: transmitting a plurality of random access preambles, where a plurality of physical random access channel occasions are used for transmission of the plurality of random access preambles, and the plurality of physical random access channel occasions respectively correspond to a plurality of physical random access channel transmissions; and monitoring the first control signaling during a first time window in response to the plurality of physical random access channel transmissions, where the length of the first time window is related to the number of the plurality of physical random access channel transmissions.

In one embodiment, the first communication device 450 corresponds to the first node in the present disclosure.

In one embodiment, the second communication device 410 corresponds to the second node in the present disclosure.

In one embodiment, the first communication device 450 is an NCR.

In one embodiment, the first communication device 450 is a wireless repeater.

In one embodiment, the first communication device 450 is a relay.

In one embodiment, the first communication device 450 is a user equipment.

In one embodiment, the first communication device 450 is a user equipment supporting V2X.

In one embodiment, the first communication device 450 is a user equipment supporting D2D.

In one embodiment, the second communication device 410 is a base station.

In one embodiment, the antenna 452, the receiver 454, the multi-antenna receiving processor 458, the receiving processor 456, and the controller/processor 459 is configured to monitor the first control signaling during the first time window.

In one embodiment, the antenna 420, the transmitter 418, the multi-antenna transmitting processor 471, the transmitting processor 416, and the controller/processor 475 is configured to transmit the first control signaling during the first time window.

In one embodiment, the antenna 452, the transmitter 454, the multi-antenna transmitting processor 457, the transmitting processor 468, and the controller/processor 459 is configured to transmit the plurality of random access preambles in the present disclosure.

In one embodiment, the antenna 420, the receiver 418, the multi-antenna receiving processor 472, the receiving processor 470, and the controller/processor 475 is configured to receive the plurality of random access preambles in the present disclosure.

An embodiment of the present disclosure further provides a computer-readable storage medium, configured to store a program. The computer-readable storage medium may be applied to the terminal or the network device provided in the embodiments of the present disclosure, and the program enables the computer to perform the method performed by the terminal or the network device in the embodiments of the present disclosure.

An embodiment of the present disclosure further provides a computer program product. The computer program product includes a program. The computer program product may be applied to the terminal or the network device provided in the embodiments of the present disclosure, and the program enables the computer to perform the method performed by the terminal or the network device in the embodiments of the present disclosure.

An embodiment of the present disclosure further provides a computer program. The computer program may be applied to the terminal or the network device provided in the embodiments of the present disclosure, and the computer program enables the computer to perform the method performed by the terminal or the network device in the embodiments of the present disclosure.

It should be understood that the terms "system" and "network" in the present disclosure may be used interchangeably. In addition, terms used in the present disclosure are only used to explain specific embodiments of the present disclosure, but are not intended to limit the present disclosure. In the specification, claims, and accompanying drawings of the present disclosure, terms such as "first", "second", "third", and "fourth" are used to distinguish different objects, but are not used to describe a specific order. In addition, the terms "include" and "have" and any variations thereof are intended to cover non-exclusive inclusion.

In the embodiments of the present disclosure, the "indication" mentioned may be a direct indication, an indirect indication, or having an association relationship. For example, A indicates B, which may represent that A directly indicates B, for example, B may be obtained by A, or may represent that A indirectly indicates B, for example, A indicates C, and B may be obtained through C, or may represent that A and B have an association relationship.

In the embodiments of the present disclosure, "B corresponding to A" represents that B is associated with A, B may be determined according to A, but it should also be understood that determining B according to A does not mean that B is determined only according to A, but that B may be determined according to A and/or other information.

In the embodiments of the present disclosure, the term "corresponding" may represent that there is a direct correspondence or an indirect correspondence between the two, or may represent that the two have an association relationship, or may be a relationship of indicating and indicated, configuring and configured, etc.

In the embodiments of the present disclosure, "pre-defined" or "pre-configured" may be implemented by pre-storing, in a device (for example, a user equipment and a network device), a corresponding code, a table, or another manner that may be used to indicate related information, which is not limited in the present disclosure. For example, the predefined may be being defined in a protocol.

In the embodiments of the present disclosure, the "protocol" may refer to a standard protocol in the field of communications, for example, may include an LTE protocol, an NR protocol, and a related protocol applied to a future communications system, which is not limited in the present disclosure.

In the embodiments of the present disclosure, the term "and/or" is merely an association relationship describing associated objects, and indicates that there may be three relationships, for example, A and/or B may indicate that A exists alone, A and B exist simultaneously, and B exists alone. In addition, the character "/" in this specification generally indicates an "or" relationship between the associated objects.

In various embodiments of the present disclosure, a size of a sequence number of each process does not mean an execution sequence, and the execution sequence of each process should be determined by its function and internal logic, and should not constitute any limitation on the implementation process of the embodiments of the present disclosure.

In the several embodiments provided in the present disclosure, it should be understood that the disclosed system, apparatus, and method may be implemented in other manners. For example, the apparatus embodiments described above are merely schematic, for example, division of the units is merely logical function division, and there may be other division manners in actual implementation, for example, a plurality of units or components may be combined or may be integrated into another system, or some features may be ignored or not performed. In addition, the displayed or discussed mutual coupling or direct coupling or communication connection may be indirect coupling or communication connection through some interfaces, devices or units, and may be in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium, for example, the computer instructions may be transmitted from a website, a computer, a server, or a data center to another website, a computer, a server, or a data center in a wired manner (for example, a coaxial cable, an optical fiber, a digital subscriber line (DSL)), or a wireless manner (for example, infrared, wireless, or microwave). The computer-readable storage medium may be any usable medium readable by a computer, or a data storage device, such as a server or a data center integrating one or more usable media. The usable medium may be a magnetic medium (for example, a floppy disk, a hard disk, or a magnetic tape), an optical medium (for example, a digital video disk (DVD)) or a semiconductor medium (for example, a solid state disk (SSD)).

The above are only specific embodiments of the present disclosure, but the protection scope of the present disclosure is not limited thereto, and any person skilled in the art can easily conceive of changes or replacements within the technical scope disclosed in the present disclosure, which shall fall within the protection scope of the present disclosure. Therefore, the protection scope of the present disclosure shall be subject to the protection scope of the claims.

What is claimed is:

1. A first node, comprising:
at least one processor; and
one or more non-transitory computer-readable storage media coupled to the at least one processor and storing programming instructions for execution by the at least one processor, wherein the programming instructions, when executed, cause the first node to perform operations comprising:
transmitting a first plurality of random access preambles by using a first spatial filter, wherein a first plurality of physical random access channel occasions are used for transmission of the first plurality of random access preambles;
monitoring a first control signaling during a first time window in response to the transmitting of the first plurality of random access preambles;
transmitting a second plurality of random access preambles by using a second spatial filter, wherein a second plurality of physical random access channel occasions are used for transmission of the second plurality of random access preambles; and
monitoring a second control signaling during a second time window in response to the transmitting of the second plurality of random access preambles;
wherein a length of the first time window is the same as a length of the second time window, and a first quantity of the first plurality of random access preambles is different than a second quantity of the second plurality of random access preambles, wherein the length of the first time window is one of a plurality of candidate time lengths, and a number of the first plurality of random access preambles is one of a plurality of candidate numbers, wherein the plurality of candidate numbers corresponds to a same candidate time length of the plurality of candidate time lengths.

2. The first node according to claim 1, wherein the first control signaling is scrambled by a first radio network temporary identifier (RNTI), and the first RNTI is associated with the first plurality of random access preambles.

3. The first node according to claim 1, wherein the second quantity is larger than the first quantity.

4. The first node according to claim 1, the operations further comprising: receiving first configuration information by using radio resource control (RRC) signaling, wherein the first configuration information comprises the plurality of candidate time lengths.

5. The first node according to claim 1, wherein each of the first quantity and the second quantity is one of: 2, 4, 8.

6. The first node according to claim 1, wherein the first plurality of random access preambles are repeating transmissions of a same random access preamble.

7. The first node according to claim 1, wherein the first plurality of physical random access channel occasions are associated with a same SS/PBCH block.

8. The first node according to claim 1, wherein receiving a second configuration information, wherein the second configuration information indicates the length of the first time window.

9. A second node, comprising:
at least one processor; and
one or more non-transitory computer-readable storage media coupled to the at least one processor and storing programming instructions for execution by the at least one processor, wherein the programming instructions, when executed, cause the second node to perform operations comprising:
receiving at least one random access preamble of a first plurality of random access preambles, wherein a first plurality of physical random access channel occasions are used for transmission of the first plurality of random access preambles;
transmitting a first control signaling during a first time window in response to the at least one random access preamble of the first plurality of random access preambles;
receiving at least one random access preamble of a second plurality of random access preambles, wherein a second plurality of physical random access channel occasions are used for transmission of the second plurality of random access preambles; and transmitting a second control signaling during a second time window in response to the at least one random access preamble of the second plurality of random access preambles;

wherein a length of the first time window is the same as a length of the second time window, and a first quantity of the first plurality of random access preambles is different than a second quantity of the second plurality of random access preambles, wherein the length of the first time window is one of a plurality of candidate time lengths, and a number of the first plurality of random access preambles is one of a plurality of candidate numbers, wherein the plurality of candidate numbers corresponds to a same candidate time length of the plurality of candidate time lengths.

10. The second node according to claim 9, wherein the first control signaling is scrambled by a first radio network temporary identifier (RNTI), and the first RNTI is associated with the first plurality of random access preambles.

11. The second node according to claim 9, wherein the second quantity is larger than the first quantity.

12. The second node according to claim 9, the operations further comprising: transmitting first configuration information by using radio resource control (RRC) signaling, wherein the first configuration information comprises the plurality of candidate time lengths.

13. The second node according to claim 9, wherein each of the first quantity and the second quantity is one of: 2, 4, 8.

14. A method, comprising:
transmitting a first plurality of random access preambles by using a first spatial filter, wherein a first plurality of physical random access channel occasions are used for transmission of the first plurality of random access preambles;
monitoring a first control signaling during a first time window in response to the transmitting the first plurality of random access preambles;
transmitting a second plurality of random access preambles by using a second spatial filter, wherein a second plurality of physical random access channel occasions are used for transmission of the second plurality of random access preambles; and
monitoring a second control signaling during a second time window in response to the transmitting the second plurality of random access preambles;
wherein a length of the first time window is the same as a length of the second time window, and a first quantity of the first plurality of random access preambles is different than a second quantity of the second plurality of random access preambles, wherein the length of the first time window is one of a plurality of candidate time lengths, and a number of the first plurality of random access preambles is one of a plurality of candidate numbers, wherein the plurality of candidate numbers corresponds to a same candidate time length of the plurality of candidate time lengths.

15. The method according to claim 14, wherein the first control signaling is scrambled by a first radio network temporary identifier (RNTI), and the first RNTI is associated with the first plurality of random access preambles.

16. The method according to claim 14, wherein the second quantity is larger than the first quantity.

17. The method according to claim 14, further comprising: receiving first configuration information by using radio resource control (RRC) signaling, wherein the first configuration information comprises the plurality of candidate time lengths.

18. The method according to claim 14, wherein each of the first quantity and the second quantity is one of: 2, 4, 8.

19. The method according to claim 14, wherein the first plurality of random access preambles are repeating transmissions of a same random access preamble.

20. The method according to claim 14, wherein the first plurality of physical random access channel occasions are associated with a same SS/PBCH block.

* * * * *